United States Patent
Dickson, Jr. et al.

(10) Patent No.: US 11,389,030 B2
(45) Date of Patent: Jul. 19, 2022

(54) VACUUM BLENDER, VACUUM BLENDER SYSTEM, AND VACUUM BLENDER LID

(71) Applicant: IDEYA LABS, LLC, Orem, UT (US)

(72) Inventors: Thomas D. Dickson, Jr., Orem, UT (US); Gregory D. Jackson, Bountiful, UT (US); David J. Throckmorton, Mapleton, UT (US)

(73) Assignee: IDEYA LABS, LLC, Orem, UT (US)

( * ) Notice: Subject to any disclaimer, the term of this patent is extended or adjusted under 35 U.S.C. 154(b) by 224 days.

(21) Appl. No.: 16/657,358

(22) Filed: Oct. 18, 2019

(65) Prior Publication Data

US 2020/0121131 A1 Apr. 23, 2020

Related U.S. Application Data

(60) Provisional application No. 62/748,241, filed on Oct. 19, 2018.

(51) Int. Cl.
*A47J 43/00* (2006.01)
*A47J 43/07* (2006.01)

(52) U.S. Cl.
CPC ....... *A47J 43/0727* (2013.01); *A47J 43/0722* (2013.01)

(58) Field of Classification Search
CPC .......................... A47J 43/0727; A47J 43/0722
See application file for complete search history.

(56) References Cited

U.S. PATENT DOCUMENTS

| | | | |
|---|---|---|---|
| 5,957,577 | A | 9/1999 | Dickson et al. |
| 2014/0137750 | A1* | 5/2014 | Arai .................. A47J 27/004 99/334 |
| 2015/0201808 | A1* | 7/2015 | Katsuki ............. A47J 43/046 99/489 |
| 2017/0086622 | A1 | 3/2017 | Chung |
| 2018/0132664 | A1 | 5/2018 | Kim |
| 2018/0310769 | A1* | 11/2018 | Kim .................. A47J 43/0716 |

FOREIGN PATENT DOCUMENTS

| CN | 105520659 A | 4/2016 |
|---|---|---|
| WO | 2013075408 A1 | 5/2013 |

OTHER PUBLICATIONS

International Search Report and Written Opinion for International Application No. PCT/US2019/057003, dated Dec. 18, 2019.

* cited by examiner

*Primary Examiner* — Anshu Bhatia
(74) *Attorney, Agent, or Firm* — Phillips Winchester; Justin K. Flanagan

(57) ABSTRACT

A vacuum blending system may be used to blend solids, powders, and/or liquids (foodstuff) in an evacuated blender jar and/or evacuated enclosure to reduce or eliminate the air included in the resulting mixture. The vacuum blending system may be embodied as a vacuum lid adaptable for use with any of a wide variety of blending systems. In other embodiments, the vacuum blending system may be embodied as a blender with an integrated vacuum system. In still other embodiments, the vacuum blending system may be embodied as a vacuum pump, and optional vacuum tank, for use with a plurality off blender enclosures. Any of these vacuum blending systems may be used to produce blended foodstuff that has superior texture, offer increased nutritional benefit, and/or remain homogeneous for longer than the same foodstuff remains well-mixed when blended in a non-vacuum.

20 Claims, 19 Drawing Sheets

VACUUM BLENDER, VACUUM BLENDER SYSTEM, AND VACUUM BLENDER LID

CROSS-REFERENCE TO RELATED APPLICATION

This application is a nonprovisional patent application of U.S. Patent Application No. 62/748,241, filed 19 Oct. 2018 and titled "Vacuum Blender, Vacuum Blender System, and Vacuum Blender Lid," the disclosure of which is hereby incorporated herein in its entirety by this reference.

TECHNICAL FIELD

The present disclosure generally relates to vacuum blender systems. Specifically, this disclosure describes a blender system utilizing a vacuum to make blended foodstuff, such as juices and smoothies, with desirable characteristics.

BRIEF DESCRIPTION OF THE DRAWINGS

The written disclosure herein describes illustrative embodiments that are non-limiting and non-exhaustive. Reference is made to certain of such illustrative embodiments that are depicted in the figures described below.

SUMMARY

Figure 1A:
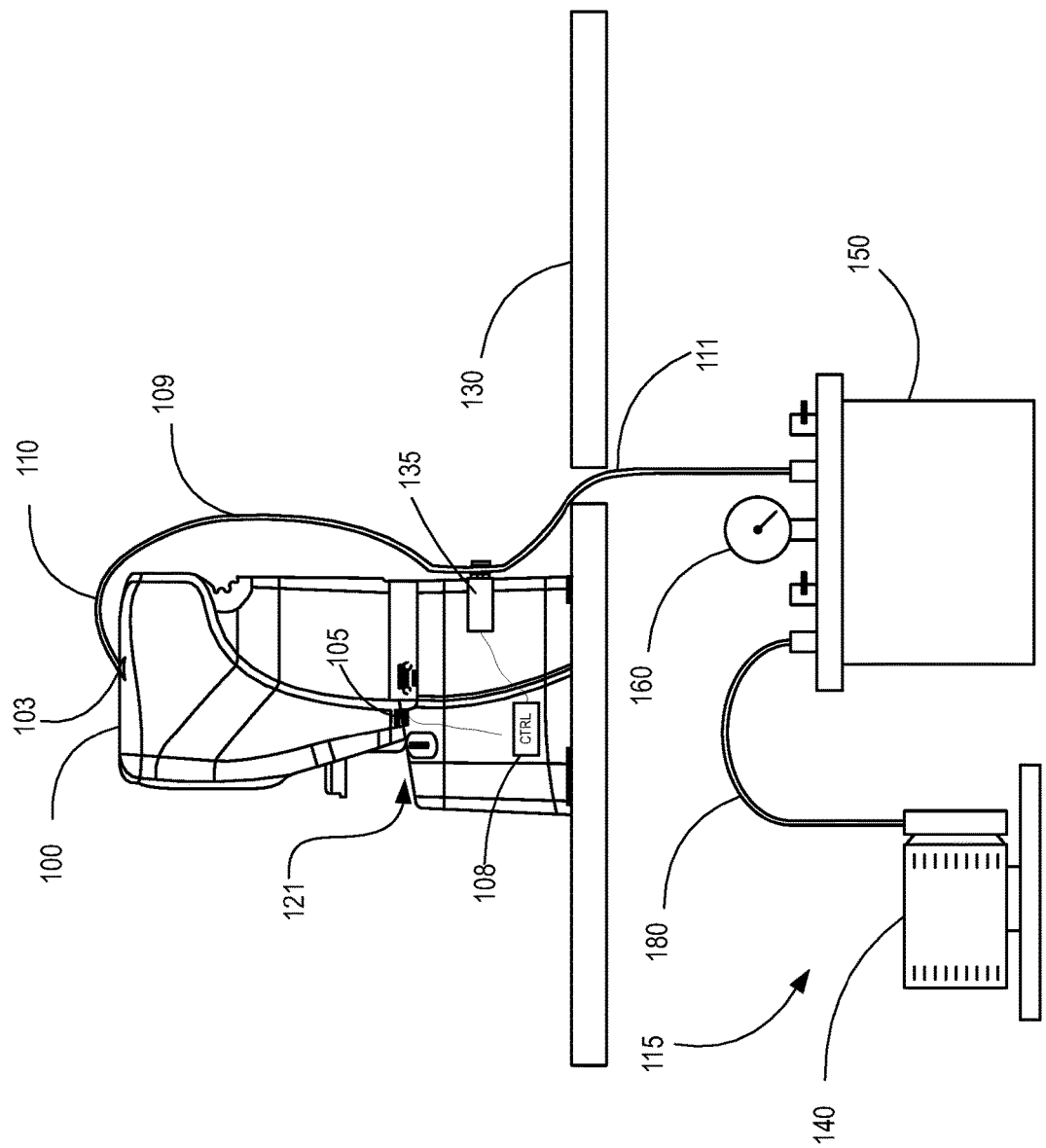
FIG. 1A illustrates one embodiment of a blender system comprising an enclosure connected to a vacuum system with a pinch valve controlled, at least in part, by an input from a Hall effect sensor and a controller.

A blending apparatus includes an enclosure configured to house a blender jar, where the enclosure includes a lid configured to form an airtight seal of the enclosure and a vacuum system in fluid communication with an interior of the enclosure. The vacuum system can be configured to remove air from the enclosure. The lid can include a suction connector configured to interface with a jar lid on the blender jar. The blending apparatus can include a valve configured to equalize the pressure in the enclosure. The blending apparatus can also include a hose to form a fluid communication between the enclosure and the vacuum system, where the valve is configured to regulate the flow of air between the vacuum system and the enclosure. The valve can be a pinch valve configured to pinch the hose in response to the lid being in an open position. The vacuum system can be configured to stop withdrawing air from the enclosure in response to the lid of the enclosure being in an open position. The blending apparatus can further include a sensor configured to determine whether the lid of the enclosure is in an open or closed position and to signal the determination of whether the lid is in an open or closed position to a controller. The vacuum system can also be simultaneously operable with a plurality of enclosures. The blending apparatus can further include a tank in fluid communication with the enclosure and the vacuum system, where the tank is configured to receive foodstuff drawn from the blender jar so that the foodstuff does not enter the vacuum system. The blending apparatus can further include a central processing unit configured to transmit instructions to the vacuum system. The blending apparatus can also include a pressure gauge configured to monitor the pressure within the enclosure.

A method for blending foodstuff can include housing a blender containing foodstuff in an enclosure that defines an airtight space, creating a vacuum inside the enclosure, and blending the foodstuff in the blender after the vacuum has been created inside the enclosure.

A blending system can include a blender, which in turn can include a blender jar configured to hold foodstuff, a blender lid configured to seal the blender jar, a vacuum system configured to remove air from the blender jar, and a lid adapter to form a fluid communication between the vacuum system and the blender jar to create a vacuum inside the blender jar. The lid can be configured to receive the foodstuff that is suctioned out of the blender jar to prevent the foodstuff from entering the vacuum system. The lid adapter can be configured to fit a plurality of different blender jars. The lid adapter can be figured to replace a fill cap in a hole of the blender lid. The vacuum system can be detachable from the blender and configured to couple with a sous vide cooking device. The lid adapter can be integrally formed on the blender lid. The vacuum system can include a hose configured to form a fluid communication between the blender and the vacuum system. The lid adapter can include a suction connector configured to interface with the blender lid.

DETAILED DESCRIPTION

Various foodstuffs and/or liquids may be blended into smoothies, juices, and/or shakes. Many people are interested in blended foodstuff to improve their health, increase their nutritional intake, and/or simplify their food preparation and cleanup. In addition, there are individuals who must eat blended foodstuff due to serious illness, injury, or other medical conditions. Many people desire that their blended foodstuff be blended sufficiently to have a smooth texture. In addition, they prefer their blended foodstuff to not separate or divide into its constituent parts for a sufficiently long enough time for consumption at a leisurely pace.

Current blending technology results in blended foodstuff that is not sufficiently blended, contain too many bubbles, and/or separate too quickly. As solids and/or liquids are blended, they incorporate the air around them into the mixture. The inclusion of air decreases the effectiveness of the blending process, includes air bubbles, and/or facilitates the separation of the constituent parts of the resulting blended foodstuff.

In some embodiments, blending foods and/or liquids in an evacuated or vacuumed blender jar eliminates the inclusion of air in the resulting product. The resulting blended foodstuff is smoother and remains mixed longer. For example, a blender jar, containing foodstuff and/or liquids, can be sealed and connected to a vacuum system. When the air is sufficiently evacuated, the blending process can be carried out in a vacuum. When blending is complete, the vacuum can be safely released, and the blended foodstuff can be consumed.

In one embodiment, a blender jar containing foodstuff and/or liquids can be sealed with a blender jar lid and/or a blender jar lid adapter and then evacuated using a vacuum system connected to the blender jar, blender jar lid, and/or blender jar lid adapter. When the air is sufficiently evacuated from the blender jar, it can be disconnected from the vacuum system. The blender jar can be placed on a countertop, under the counter, and/or an enclosed blender base where the blending process takes place. At the end of the blending process, a vacuum release valve can be actuated to equalize the pressure. The blender jar lid and/or blender jar lid adapter can then be safely removed to access the blended mixture. In various embodiments, the blender jar lid may be ridged and sufficiently strong to help prevent the walls of a blender jar from collapsing, caving in, or flexing beyond a predetermined tolerance level, if at all.

In another embodiment, a blender jar containing foodstuff and/or liquids can be sealed with a blender jar lid and/or a blender jar lid adapter and then evacuated using a vacuum system connected to the blender jar, blender jar lid, and/or blender jar lid adapter. In this embodiment, the vacuum system remains connected to the blender system throughout the blending process. At the end of the blending process, a vacuum release valve can be actuated to equalize the pressure. The blender jar lid can then be safely removed to access the blended mixture.

In some embodiments, a blender jar lid adapter is placed on a blender jar lid. The vacuum system is attached to the blender jar lid adapter. During the process of achieving a vacuum in the blender jar, the blender jar lid adapter reduces the likelihood of foodstuff and/or liquids entering the vacuum system.

In some embodiments, a blender jar lid adapter is employed to enable vacuum blending with blender systems not intended and/or designed for vacuum blending. For example, blender jar lid adapters may be manufactured to fit numerous blender jar lids from a multiplicity of manufacturers. The addition of a blender jar lid adapter and a vacuum system allows any blender to be used to perform vacuum blending.

In one embodiment, a blender jar lid is replaced with a vacuum blender jar lid that comprises a vacuum system, control electronics, power supply, and/or an operator notification and control panel. The control electronics may determine when a sufficient vacuum has been reached, may determine when it is safe to remove the vacuum blender jar lid, and may determine the temperature of the mixture, consistency of the mixture, and/or other control or informational items of interest. The operator notification and control panel may collect operator input such as "begin air evacuation" and/or "equalize pressure." The vacuum blender jar lid may also control properly equipped blender systems that are connected to it via wires. Alternatively, the vacuum blender jar lid may also control properly equipped blender systems that are connected to it wirelessly.

The power supply for the vacuum blender jar lid may comprise a wired AC, a wired DC, and/or a battery subsystem. A battery-operated version may comprise either replaceable or rechargeable batteries. Rechargeable batteries may be charged separately from the vacuum blender jar lid and/or the entire jar lid may be connected to a charging system.

In one embodiment, the vacuum blender jar lid's operator notification and control panel may be disconnected from the vacuum blender jar lid and used remotely. For example, the operator notification and control panel may be removed, connected to the vacuum blender jar lid via an interconnect, and/or remotely operated. The operator notification and control panel may also be implemented remotely as a web-based or native application on a mobile device or computer. An interconnect, may for example be a mechanical communication device, a binary electrical signal (e.g., on/off), a multistate electrical signal, a multiwire bus, a single-wire electrical connection, or other communication medium. In some embodiments, the interconnect may be wireless (e.g., Bluetooth, NFC, WiFi, etc.).

In some embodiments, vacuum blender jar lids may be manufactured to enable vacuum blending with blender systems not intended and/or designed for vacuum blending. For example, vacuum blender jar lids may be manufactured to fit numerous blender jars from a multiplicity of manufacturers.

The addition of a vacuum blender jar lid allows any blender to be used to perform vacuum blending.

In some embodiments, the vacuum system may have a multiplicity of connections. These connections may be used for additional blender systems and/or for other appliances and/or processes. For example, some connections could be used for vacuum sealing foods (e.g., vacuum-sealed storage bags) and/or for preparing foods using the sous vide cooking technique.

In some embodiments, the vacuum system comprises one or more vacuum pumps. In other embodiments, the vacuum system comprises one or more vacuum pumps connected to one or more vacuum tanks. These tanks may or may not have gauges for measuring pressure. These tanks may or may not have drains to facilitate the removal of solids or liquids that may be introduced before, during, and/or after the blending process.

In some embodiments, the vacuum system indicates when a sufficient vacuum is achieved. This indication may be visual, audible, and/or use other means of notification. The blender system may be inoperable until a sufficient vacuum is reached and/or indicated. While a sufficient vacuum is being obtained, the blender system may indicate this state to an operator.

In some embodiments, the vacuum system comprising vacuum pumps and/or vacuum tanks may have one or more exhaust ports that allow food particles and/or liquids to exit the vacuum system. These exhaust ports make exhausted materials visible to the operator to indicate that food and/or liquids are being ingested by the vacuum system. The operator may take appropriate action.

In one embodiment, a blender system is contained in a blender enclosure that can be open or closed. A sensor is employed to indicate to the vacuum system whether the enclosure is open or closed. When the enclosure is open, the vacuum system is not connected to the blender jar, blender jar lid, and/or blender jar lid adapter. When the enclosure is closed, the vacuum system is connected to the blender jar, blender jar lid, and/or blender jar lid adapter and operates until a sufficient vacuum is obtained. When the blending process is complete, and the blender enclosure is opened, the vacuum system is notified and disconnected from the blender jar, blender jar lid, and/or blender jar lid adapter. The pressure is manually equalized, or equalized through a controlled leak, allowing safe removal of the blender jar lid and/or blender jar lid adapter.

In one embodiment, a multiplicity of blender systems in blender enclosures is connected to a single vacuum system. Each blender enclosure can be open or closed. When any enclosure is closed, the vacuum system is connected to the associated blender jar, blender jar lid, and/or blender jar lid adapter and operates until a sufficient vacuum is obtained. When the blending process is complete, and the blender enclosure is opened, the vacuum system is disconnected from that blender jar, blender jar lid, and/or blender jar lid adapter. The pressure is equalized allowing safe removal of the blender jar lid, and/or blender jar lid adapter.

In one embodiment, a multiplicity of blender systems in blender enclosures, each with an electronic vacuum valve, is connected to a vacuum system through these valves. Each blender enclosure can be open or closed. Each blender enclosure has a sensor to indicate to their associated electronic vacuum valve whether the enclosure is open or closed. When an enclosure is open, the associated electronic vacuum valve is closed, terminating the connection between the associated blender jar, blender jar lid, and/or blender jar lid adapter and the vacuum system. When any enclosure is closed, its associated electronic vacuum valve is open and the vacuum system is connected to the associated blender jar, blender jar lid, and/or blender jar lid adapter, and operates until a sufficient vacuum is obtained. When the blending process is complete and the blender enclosure is opened, the electronic vacuum valve is closed, disconnecting the vacuum system from the associated blender jar, blender jar lid, and/or blender jar lid adapter. The pressure is equalized allowing safe removal of the blender jar lid, and/or blender jar lid adapter.

In some embodiments, the air in an environment surrounding a blender system can be evacuated. For example, an unsealed blender jar and associated blender base can be housed in a blender enclosure. In some embodiments, the blender jar within the blender enclosure may still include a lid. In other embodiments, the blender jar within the blender enclosure may not have a lid and/or the top portion of the enclosure may contact the blender jar and serve as a lid. As described below, the blender enclosure may be evacuated to form a vacuum therein or just the blender jar (with a separate lid or with the top of the blender enclosure serving as a lid) may be evacuated to form a vacuum therein while the remainder of the enclosure remains at or approximately at atmospheric pressure.

In various embodiments, a vacuum system can sufficiently evacuate the air from the closed blender enclosure. This causes a vacuum to exist in the unsealed blender jar. In this arrangement the blending action takes place in a vacuum, resulting in the desired outcome. At the end of the blending process the pressure is equalized, and the enclosure unlocks when it is safe to open.

In one embodiment, a blender system comprising a blender base, blender adapter, and flexible container containing ice and/or other food and/or liquid, is installed in a blender enclosure (with a lid, without a lid, or with the top of the enclosure serving as the lid). A sensor is employed to indicate to the vacuum system whether the enclosure is open or closed. When the enclosure is open, the vacuum system is not connected to the blender adapter. When the enclosure is closed, the vacuum system is connected to the blender adapter and operates until a sufficient vacuum is obtained within the flexible container. When the blending process is complete and the blender enclosure is opened, the vacuum system is notified and disconnected from the blender adapter. The pressure is equalized allowing safe removal of the flexible container from the blender adapter.

In some embodiments, the air in an environment surrounding a blender system comprising a blender base, blender adapter, and flexible container containing ice and/or other foodstuff and/or liquid, can be evacuated. When the blending process occurs, the ice is melted and the volume of the container's content decreases, resulting in a partial vacuum within the flexible container. The pressure within the flexible container is not restored from without because it is in an evacuated blender enclosure. Again, the blending action takes place in a vacuum, resulting in the desired outcome. When blending is complete, the pressure is equalized and the enclosure is unlocked.

The embodiments of the disclosure can be further understood by reference to the drawings of some specific example embodiments, wherein like parts are designated by like numerals throughout. The components of the disclosed embodiments, as generally described and illustrated in the figures herein, could be arranged and designed in a wide variety of different configurations. Thus, the following description of the embodiments of the systems and methods of the disclosure is not intended to limit the scope of the disclosure, as claimed, but is merely representative of possible embodiments.

It is particularly appreciated that many of the components could be resized, reshaped, lengthened, shortened, etc. It is also appreciated that a wide variety of connections, couplings, and fasteners could be utilized in addition to, or as alternatives to, those shown in the figures. In fact, many possible options and variations are intentionally not illustrated to avoid obscuring other aspects of the illustrated embodiments.

The various components described herein may be manufactured using a wide variety of metals, plastics, glasses, woods, and other materials known to be useful in manufacturing. In some cases, well-known structures, materials, or operations may not be shown or described in detail to avoid obscuring aspects of the disclosure. Furthermore, the described features, structures, or characteristics may be combined in any suitable manner in one or more alternative embodiments.

It is appreciated that various mechanical interfaces may be substituted with alternative mechanical components that provide a similar function. For example, press-fit interference fittings may be replaced with screw fittings, glued fittings, clamps, and the like. Detents, protrusions, depressions, snap fittings, press-fittings, rubber seals, screw fittings, interference fittings, and the like may be used interchangeably and/or in combination to accomplish the described functions.

The phrases "connected to," "coupled to," and "in communication with" refer to any form of interaction between two or more components, including mechanical, electrical, magnetic, and electromagnetic interaction, depending on the context. Two components may be connected to each other, even though they are not in direct contact with each other, and even though there may be intermediary devices between the two components.

FIG. 1A illustrates a blender enclosure 100 connected to a vacuum system 115 comprising a vacuum pump 140 and a tank 150. The vacuum system 115 can be positioned below a counter 130 on which the enclosure 100 rests. In one embodiment, the enclosure 100 includes a lid portion that can be opened and closed. The enclosure 100 can include a sensor configured to determine whether the enclosure is in an open or closed state. In some embodiments, a Hall effect sensor 121 detects the presence of a magnet 105 when the blender enclosure 100 is closed. The magnet 105 may be positioned on the lid portion of the enclosure 100, the lid portion being configured to separate from the Hall effect sensor 121 as the enclosure 100 is opened The Hall effect sensor 121 may provide a signal to a controller 108 within the blender base that can initiate one or more vacuum blend cycles of the vacuum system 115 and can actuate a pinch valve 135. The pinch valve 135 may automatically or manually (e.g., via a user control interface) control fluid communication (e.g., airflow) between an upper portion 110 of a vacuum hose 109 to a lower portion 111 of the vacuum hose 109.

In addition, the upper portion 110 of the vacuum hose 109 may be connected to the enclosure 100. In the illustrated embodiment, a suction cup interface 103 may facilitate a vacuum connection to a blender jar placed within the enclosure 100. When the enclosure 100 is open, the Hall effect sensor 121 will not detect the magnet 105, and the pinch valve 135 may remain closed. That is, the pinch valve 135 may pinch the vacuum hose 109 and prevent the upper portion 110 of the vacuum hose from pulling a vacuum even while the lower portion 111 of the vacuum hose remains connected to the vacuum tank 150. Pressure gauge 160 can monitor the state of the vacuum tank 150. In some embodiments, the pressure gauge 160 can be attached to and monitor the pressure within the enclosure 100. The vacuum tank 150 can have drains to facilitate the removal of solids or liquids that may be introduced before, during, and/or after the blending process.

Figure 1B:
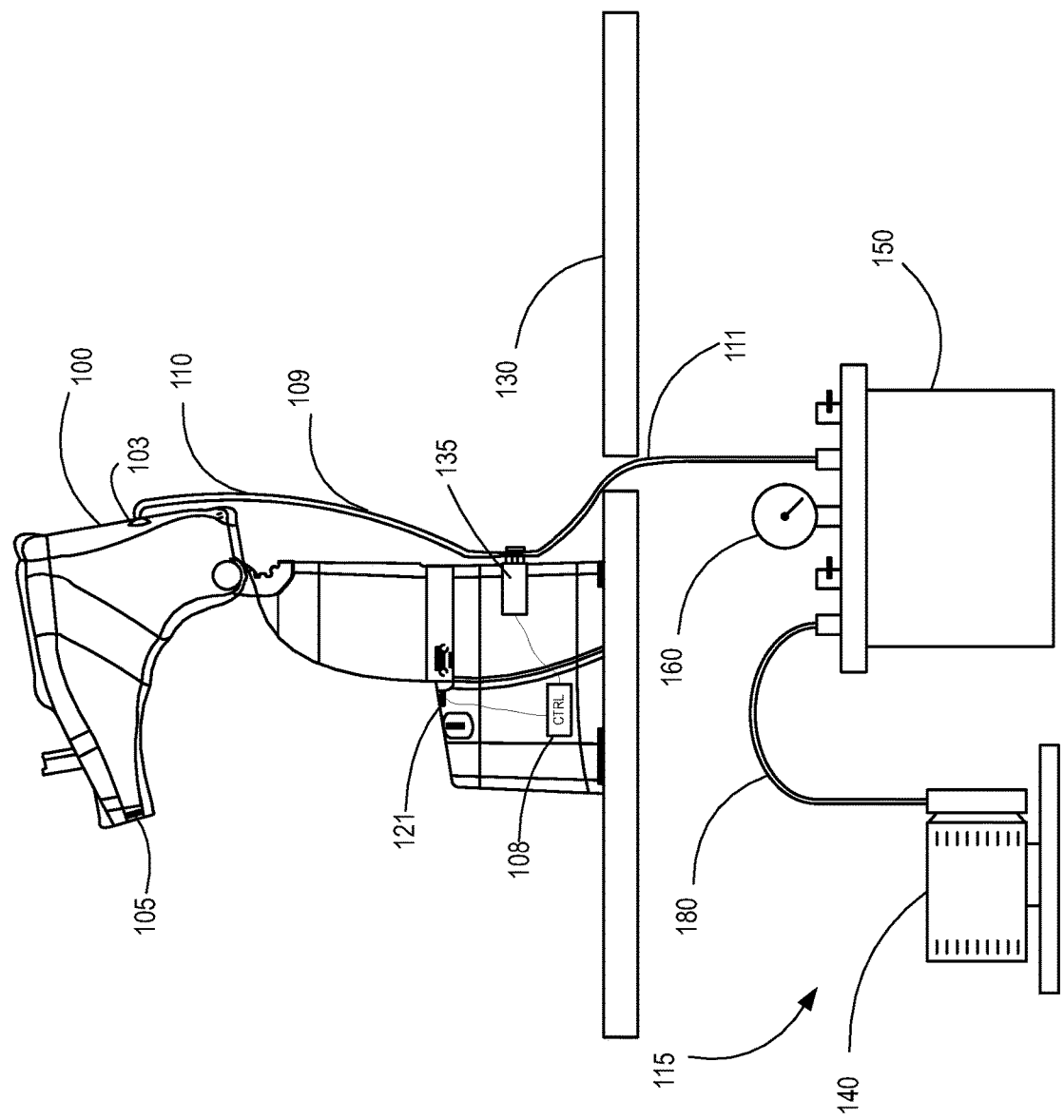
FIG. 1B illustrates the blender system of FIG. 1A, with the enclosure open and the pinch valve closing the vacuum hose connection, according to one embodiment.

FIG. 1B illustrates the blender system of FIG. 1A, with the enclosure 100 open and the pinch valve 135 closing the vacuum hose 109, thereby closing the fluid communication between the upper portion 110 of the vacuum hose 109 and lower portion 111 of the vacuum hose 109, according to one embodiment. The vacuum hose 109 may be a continuous tube that is external to the blender enclosure 100 to allow for easy removal and/or replacement. The hose 109 may be removable and replaceable within the pinch valve 135. When the Hall effect sensor 121 does not sense the magnet 105 in the lid, the controller 108 may transmit a signal to the pinch valve 135 to cause it to pinch the vacuum hose 109 between the upper portion 110 and the lower portion 111. It will be appreciated other types of valves can be implemented to close off the airflow in the vacuum hose 109. In some embodiments, the pinch valve 135 can be mechanically linked with the enclosure 100 such that the motion of opening the enclosure 100 causes motion in an actuator which then causes the pinch valve to pinch shut the vacuum hose 109.

A blend cycle may be selected by the user (e.g., smoothie cycle) and the controller 108 may implement the cycle by first confirming that the enclosure 100 is closed via the Hall effect sensor 121 sensing the magnet 105. When the cycle is complete, the controller 108 may cause the pinch valve 135 to pinch the vacuum hose 109 between the upper portion 110 and the lower portion 111. The upper portion 110, the suction cup interface 103, and/or the lid of a blender jar may be configured to allow for a controlled leak. The controlled leak may allow the vacuum to be released from the suction cup interface 103 and the lid of the blender jar by releasing the vacuum in at least the upper portion 110 of the vacuum hose 109. The controlled leak allows the enclosure 100 to be opened without remaining vacuumed to the lid of the blender jar.

Figure 1C:
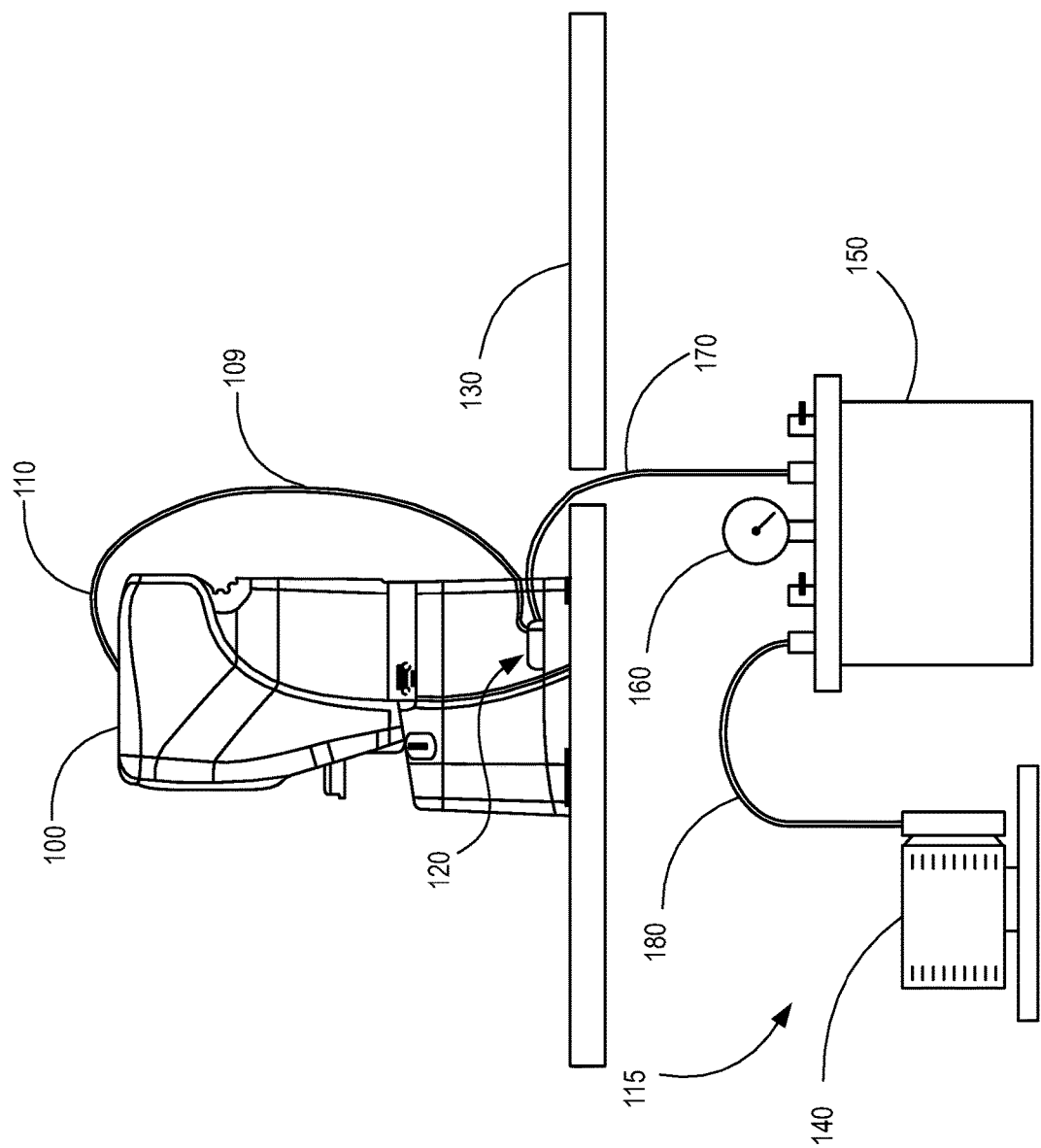
FIG. 1C illustrates the blender system of FIG. 1A connected to a vacuum system with a different type of vacuum controller.

FIG. 1C illustrates a blender enclosure 100 connected to a vacuum system 115 comprising a vacuum tank 150 in/under the counter 130 (an "in-the-counter" pump system). A vacuum pump 140 is connected via vacuum hose 180 to the vacuum tank 150. In one embodiment, an internal electronic vacuum valve 120 connects the upper portion of the 110 to a vacuum tank hose 170 when the enclosure 100 is closed. When the enclosure 100 is closed, the upper portion 110 can be connected to a blender jar, blender jar lid, and/or blender jar lid adapter, when present. When the enclosure 100 is open, the electronic vacuum valve 120 disconnects the upper portion 110 from vacuum tank hose 170. Pressure gauge 160 facilitates monitoring the state of the vacuum tank 150.

Figure 2:
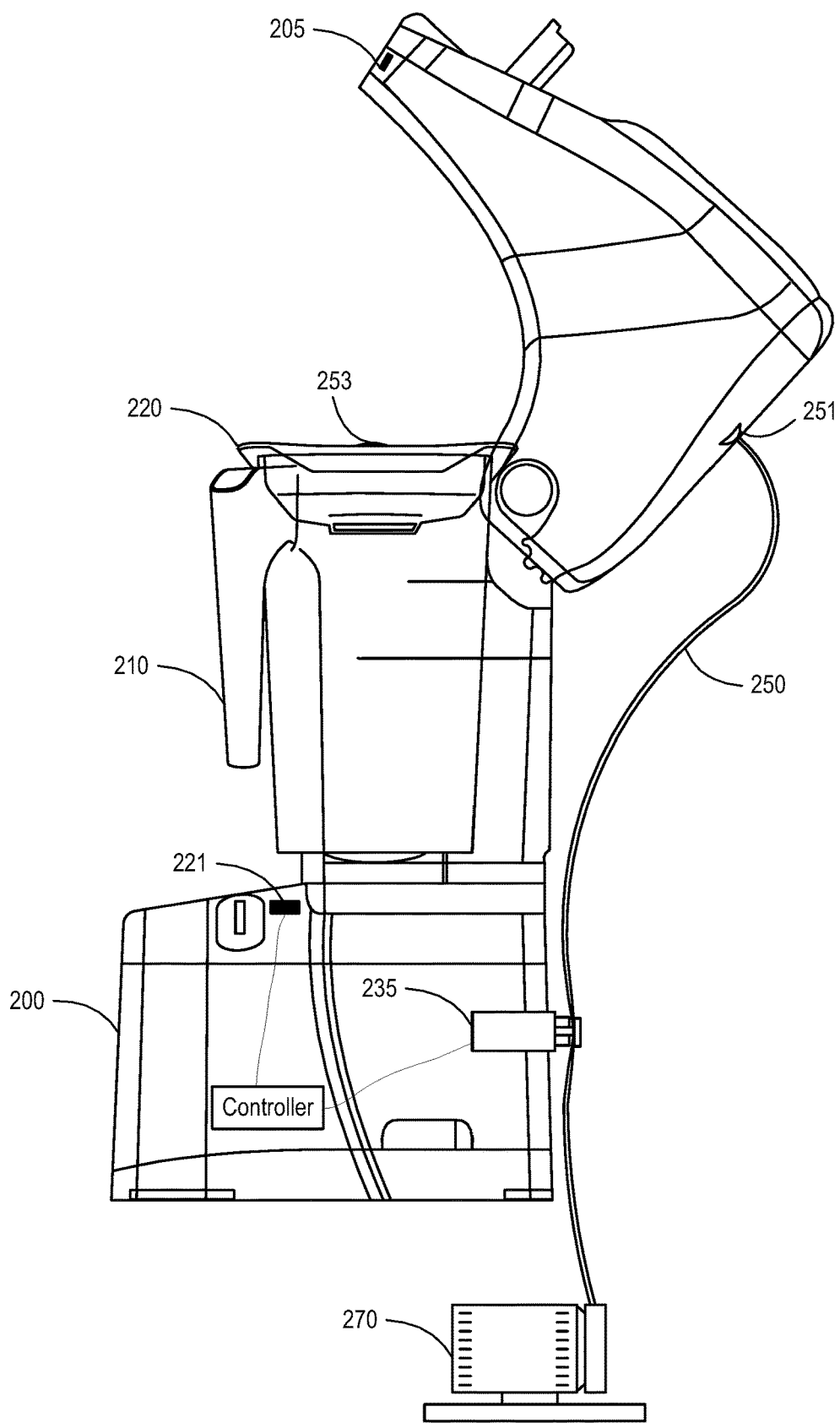
FIG. 2 illustrates the blender system of FIG. 1A with the enclosure in an open configuration and a blender jar disposed in the enclosure.

FIG. 2 illustrates a blender jar 210 with blender jar lid 220 in an open blender enclosure 200 that is connected via vacuum hose 250 to a vacuum pump 270. In one embodiment, a blender base is also contained in the blender enclosure 200. A Hall effect sensor 221 is employed to indicate to the vacuum system whether the enclosure 200 is open or closed based on the detection of a magnet 205 in the enclosure 200. When the enclosure 200 is open, the pinch valve 235 pinches the vacuum hose 250, thereby disconnecting the vacuum system from the blender jar 210, blender jar lid 220, and/or blender jar lid adapter (not pictured). If the pinch valve 235 is retracted, and the enclosure 200 is closed, a vacuum can be obtained within the blender jar 210 via hose 250 and suction connector 251 connected to a hose interface 253 on the blender jar lid 220. In some embodiments, the hose interface 253 may be a floating plug that can be used to seal a hole in the blender jar lid 220 in both directions and/or to release the pressure therein.

The hose interface 253 may also serve as a pressure release valve to allow an operator to release the vacuum within the blender jar 210. When the blending process is complete, the vacuum system may be notified to disengage the vacuum. A controlled leak may release the pressure in the vacuum hose 250 to allow the blender enclosure 200 to be opened. The pressure may be equalized manually or through a controlled leak (e.g., via hose interface 253 on the blender jar 210), allowing safe removal of the blender jar lid 220. The vacuum hose 250 may be removable and replaceable within the pinch valve 235.

Figure 3A:
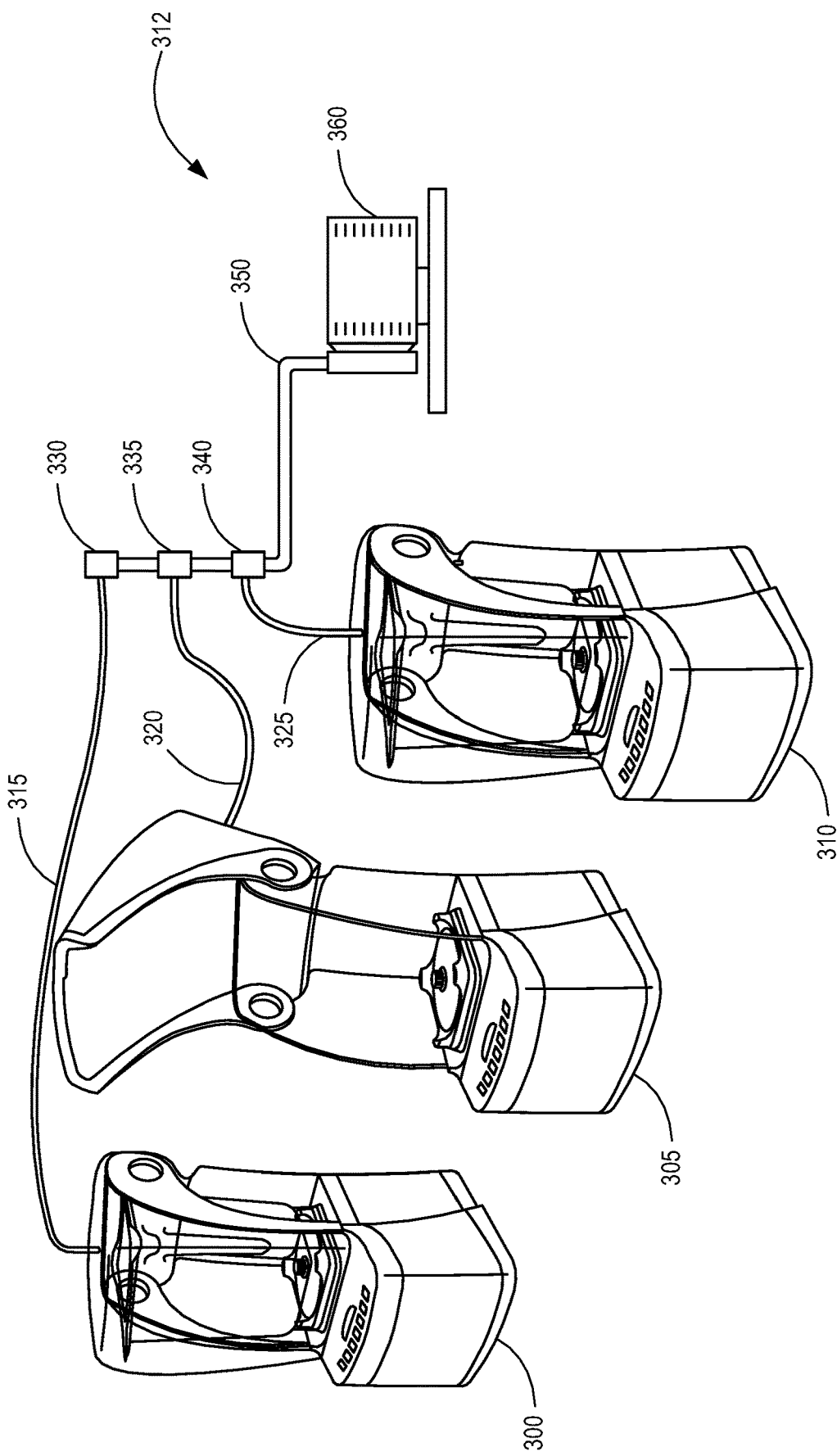
FIG. 3A illustrates three blender enclosures connected to a vacuum system with a single vacuum pump, via hoses and hose fittings.

FIG. 3A illustrates three blender enclosures 300, 305, and 310 connected to a vacuum system 312. In one embodiment, a multiplicity of blender systems in blender enclosures 300, 305, and 310 is connected to a vacuum system comprising a single vacuum pump 360. Each blender enclosure (300, 305, and 310) can be opened or closed, independent of the other blender enclosures. When any enclosure (300, 305, or 310) is closed, the vacuum system 312 is connected to the associated blender jar, blender jar lid, and/or blender jar lid adapter via vacuum hoses 315, 320, and 325 that connect to hose fittings 330, 335, and 340 respectively, that in turn connect to vacuum hose 350. The vacuum system 312 operates until a sufficient vacuum is obtained. When the blending process is complete and the blender enclosure 300, 305 or 310 is opened, the vacuum system 312 is disconnected from that blender jar, blender jar lid, and/or blender jar lid adapter. The pressure is equalized allowing safe removal of the blender jar lid, and/or blender jar lid adapter.

Figure 3B:
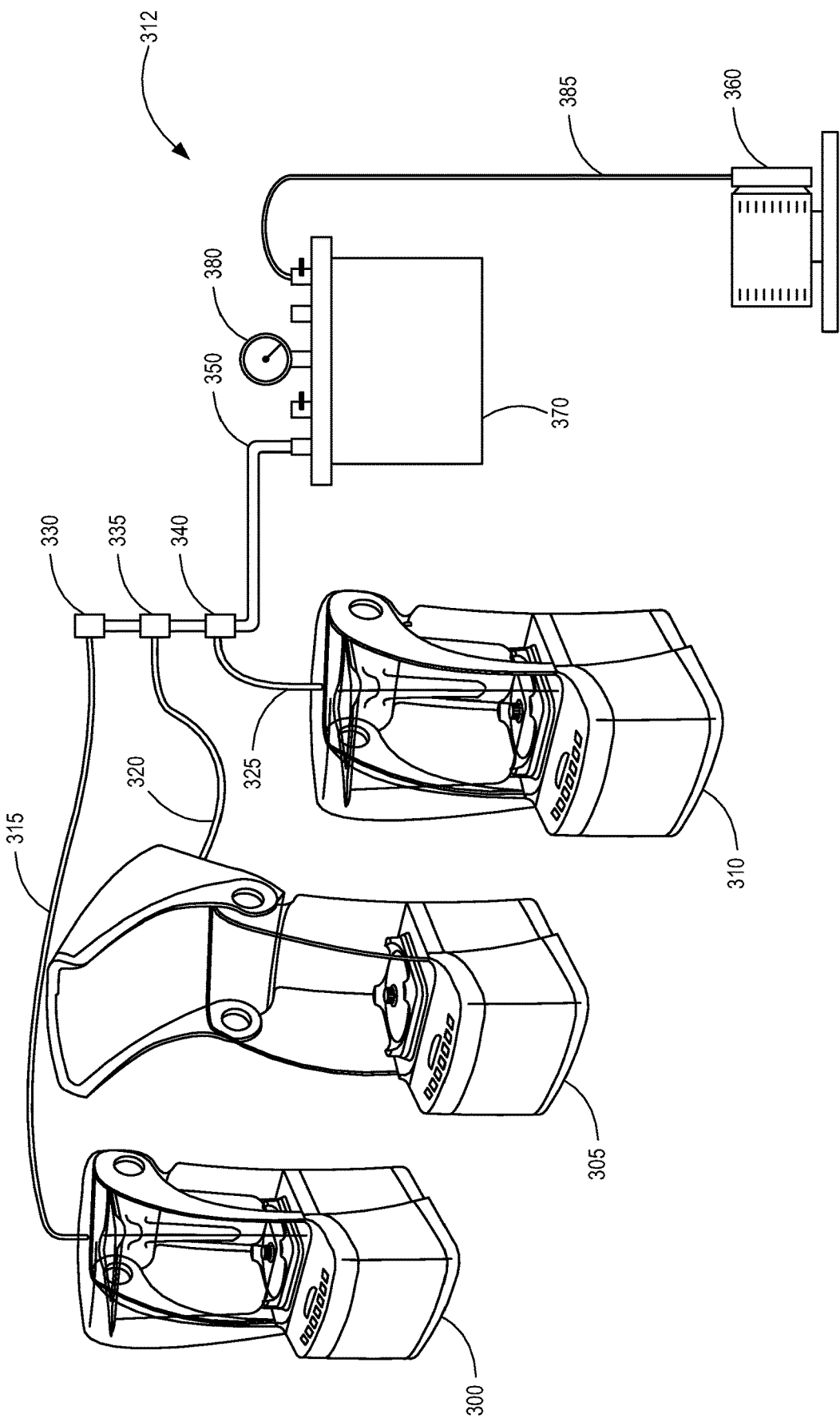
FIG. 3B illustrates three blender enclosures connected via hoses and hose fittings to a vacuum system comprising a vacuum pump and a vacuum tank with a pressure gauge.

FIG. 3B illustrates three blender enclosures 300, 305, and 310 connected to a vacuum system 312. In one embodiment, a multiplicity of blender systems in blender enclosures 300, 305, and 310 is connected to the vacuum system 312 comprising a vacuum tank 370, with vacuum gauge 380, connected to a vacuum pump 360 via vacuum hose 385. Each blender enclosure 300, 305, and 310 can be open or closed. When any enclosure 300, 305, or 310 is closed, the vacuum system is connected to the associated blender jar, blender jar lid, and/or blender jar lid adapter via vacuum hoses 315, 320, and 325 that connect to hose fittings 330, 335, and 340 that in turn connect to vacuum hose 350. The vacuum system operates until a sufficient vacuum is obtained. When the blending process is complete and the blender enclosure 300, 305, or 310 is opened, the vacuum system 312 is disconnected from that blender jar, blender jar lid, and/or blender jar lid adapter. The pressure is equalized allowing safe removal of the blender jar lid, and/or blender jar lid adapter.

Figure 3C:
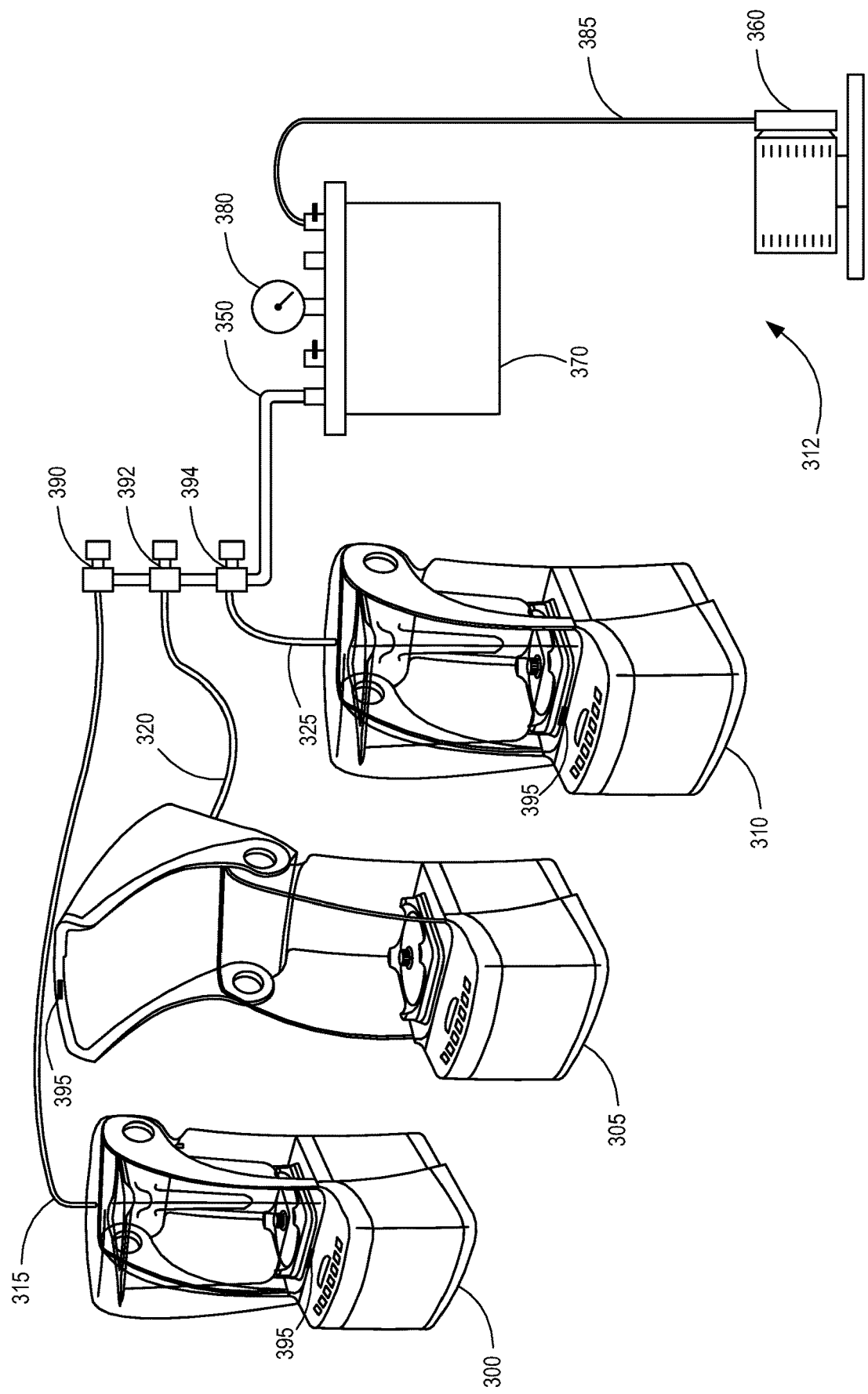
FIG. 3C illustrates three blender enclosures connected via hoses and valves, controlled by enclosure sensors, to a vacuum system comprising a vacuum pump and vacuum tank with a pressure gauge.

FIG. 3C illustrates three blender enclosures 300, 305, and 310 connected to a vacuum system 312. In one embodiment, a multiplicity of blender systems in blender enclosures 300, 305, and 310, each with a magnet 395 and corresponding Hall effect sensor (not shown), is connected, via these valves, to the vacuum system 312 comprising a vacuum tank 370, with vacuum gauge 380 connected to a vacuum pump 360 via vacuum hose 385. Each blender enclosure 300, 305, and 310 can be open or closed. Each blender enclosure 300, 305, and 310 has a Hall effect sensor (not shown) to indicate to their associated electronic vacuum valve 390, 392, or 394, via an electronic, mechanical, or pressure sensor, whether the enclosure is open or closed.

When any enclosure 300, 305, or 310 is open, the associated electronic vacuum valve 390, 392, or 394 is closed, terminating the connection between the associated blender jar, blender jar lid, and/or blender jar lid adapter and the vacuum system 312. When any enclosure 300, 305, or 310 is closed, its associated electronic vacuum valve 390, 392, or 394 is open and the vacuum system 312 is connected to the associated blender jar, blender jar lid, and/or blender jar lid adapter, and operates until a sufficient vacuum is obtained. When the blending process is complete and the blender enclosure 300, 305, or 310 is opened, the electronic vacuum valve 390, 392, or 394 is closed, disconnecting the vacuum system 312 from the associated blender jar, blender jar lid, and/or blender jar lid adapter. The pressure is equalized allowing safe removal of the blender jar lid, and/or blender jar lid adapter.

Figure 4:
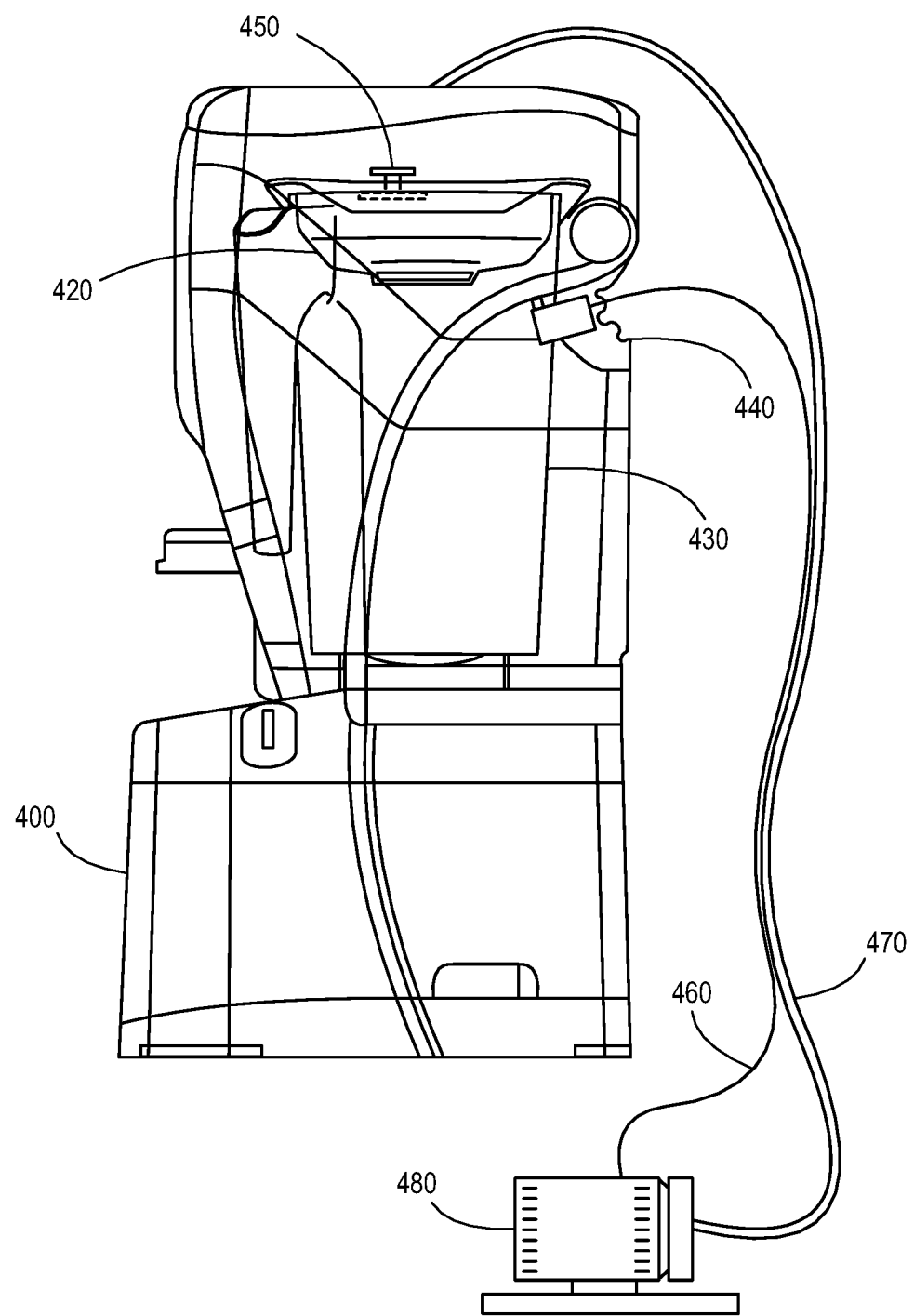
FIG. 4 illustrates a blender system with a vacuum release vent in a blender enclosure connected to a vacuum system, comprising a vacuum pump, via a hose and sensor cable.

FIG. 4 illustrates a blender jar 430 with a blender jar lid 420 that in turn has a vacuum release vent or "floating plug" 450. The vacuum release vent or floating plug 450 may also serve as a vacuum hose connection point. In various embodiments, the vacuum hose 470 may include a vacuum connection interface (e.g., a suction cup) within the enclosure 400 that contacts and seals with the floating plug 450. The vacuum hose 470 is connected to a vacuum system, comprising a vacuum pump 480. The blender enclosure sensor 440 communicates with the vacuum pump 480 via interconnect 460 to indicate the status of the enclosure 400 (closed or open). In other embodiments, a Hall effect sensor is used instead, as described in conjunction with other embodiments herein. In one embodiment, the pressure is equalized after the blending process is complete by the manual actuation of the vacuum release vent 450. For example, an operator may use a fingernail to lift the floating plug 450 slightly and thereby release the vacuum within the blender jar 430.

Figure 5B:
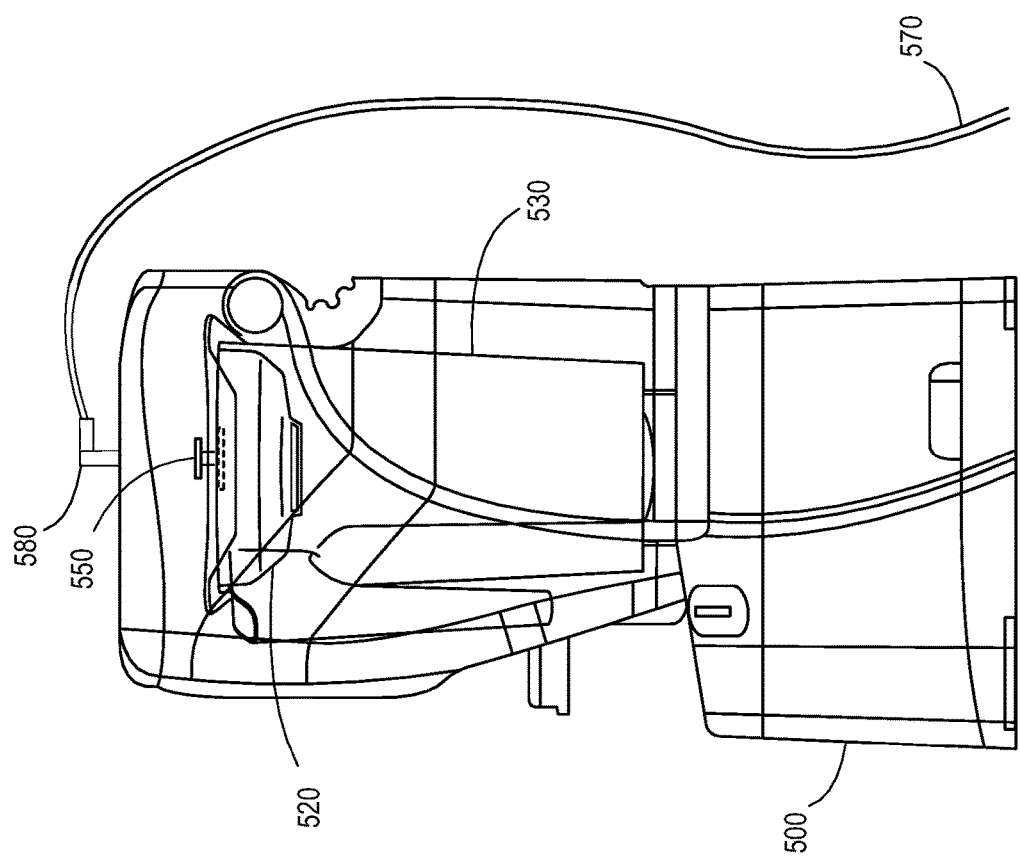
FIG. 5B illustrates a side view of the blender system of FIG. 5A in a closed configuration with the vacuum hose connected to the enclosure via a fitting.
Figure 5A:
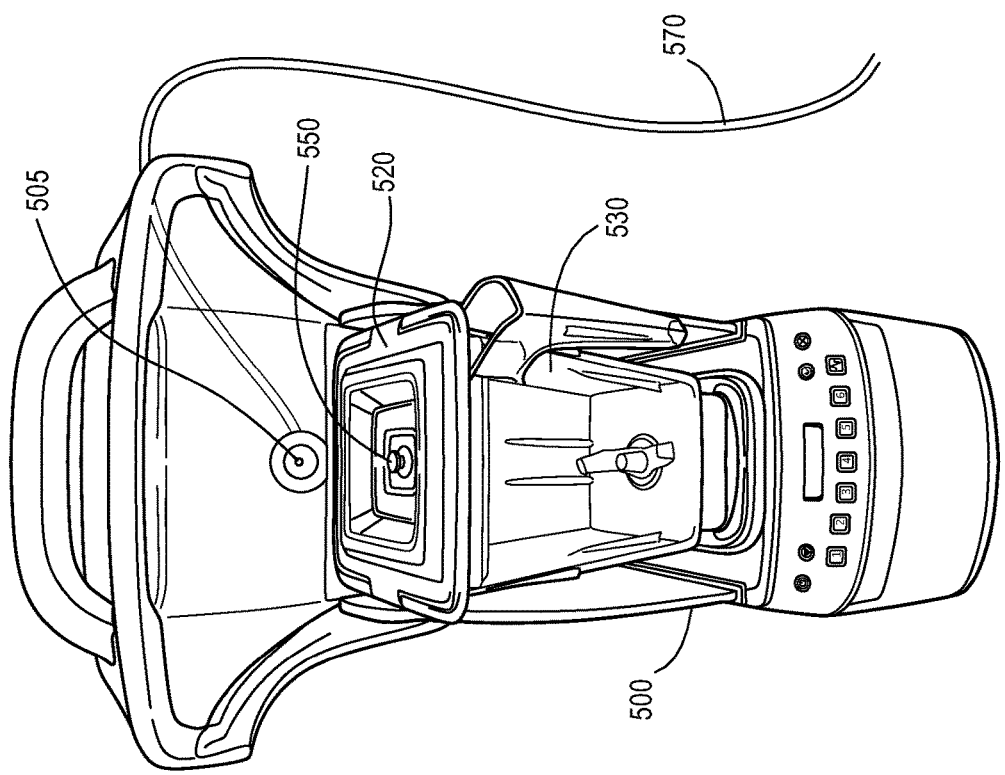
FIG. 5A illustrates a blender system with the enclosure comprising a suction connector that interfaces with a floating plug on the blender lid of the blender jar.

FIG. 5A illustrates an open enclosure 500 revealing the bottom side of a suction connector 505 that interfaces with a floating plug hose interface 550 on the blender lid 520 of the blender jar 530. As illustrated, the suction connector 505 is released from the floating plug hose interface 550 when the enclosure 100 is opened. The floating plug 550 can include a smaller side of the plug that faces externally (i.e., toward the top of the enclosure 500, and a larger side of the plug that faces internally (i.e., toward the bottom of the blender jar 530. In some embodiments, the floating plug 550 can be configured with the smaller side of a floating plug facing inward and the larger side of the floating plug vacuum hose interface facing outward.

FIG. 5B illustrates a side view of the blender system of FIG. 5A with the vacuum hose 570 connected to the blender jar 530 via a fitting 580 passing through the enclosure 500, a suction connector 505, and a hose interface 550 in the blender lid 520 of the blender jar 530. As previously described, the enclosure may have a magnet in it that can be detected by a Hall effect sensor. Closure of the enclosure 500 may result in a vacuum being pulled in some embodiments. For example, a controller may turn on a vacuum pump and/or open a valve (e.g., a pinch valve) to create a vacuum within the hose, which in turn creates a vacuum within the blender jar.

As illustrated, the fitting 580 may connect the suction connector 505 to the vacuum hose 570 through the enclosure 500. The suction connector 505 may interface with a hose interface 550 (e.g., a floating plug) in the blender lid 520 of a blender jar 530.

In some embodiments, the controller may initiate the vacuum within the blender jar only after a blending cycle is chosen. The vacuum may be created prior to blending, during the blending, or at various stages of the blending. In some embodiments, the blades of the blender jar may be caused to turn slightly while the vacuum is pulled so an operator can see that the selected blending cycle has been initiated. The actual blending cycle may start once the vacuum is at a desired or target level.

Figure 6A:
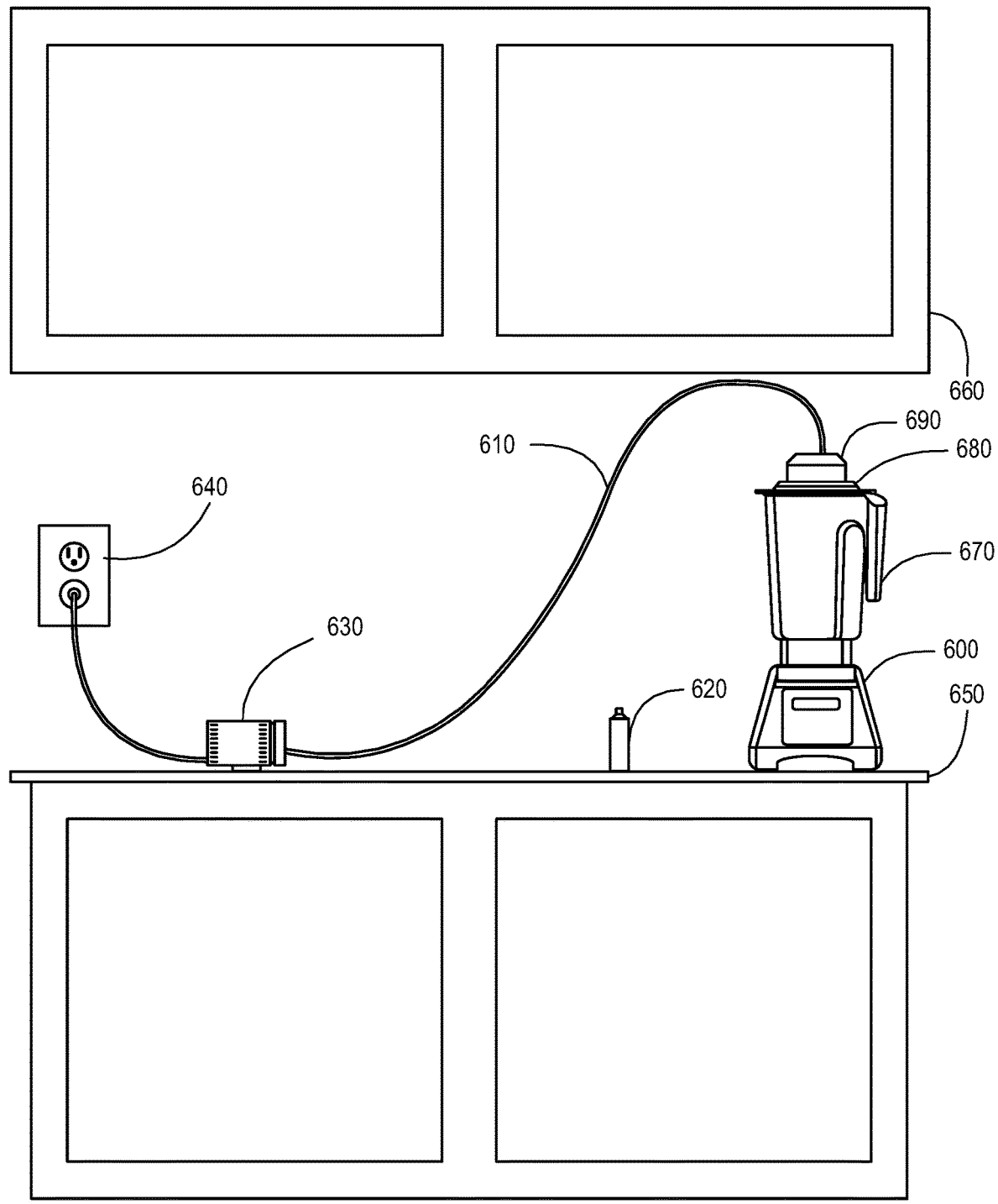
FIG. 6A illustrates a countertop blender with a jar lid adapter connected to a vacuum system comprising a vacuum pump that has an additional vacuum connection.

FIG. 6A illustrates a blender system comprising a countertop blender base 600, blender jar 670, blender jar lid 680, and blender jar lid adapter 690. In one embodiment, the blender jar 670 containing foodstuff and/or liquids can be sealed with the blender jar lid 680 and/or the blender jar lid adapter 690 and then evacuated using a vacuum pump 630 in fluid communication with the blender jar 670, blender jar lid 680, and/or blender jar lid adapter 690. In this embodiment, the vacuum system can remain connected to the blender system throughout the blending process. The blender jar lid adapter 690 is connected via vacuum hose 610 to the vacuum pump 630 powered from wall outlet 640. The vacuum hose 610 can be selectively detached from the jar lid adapter 690 and connected to a different blender or another device, such as a sous vide cooking device 620 or a vacuum storage sealer.

Figure 6B:
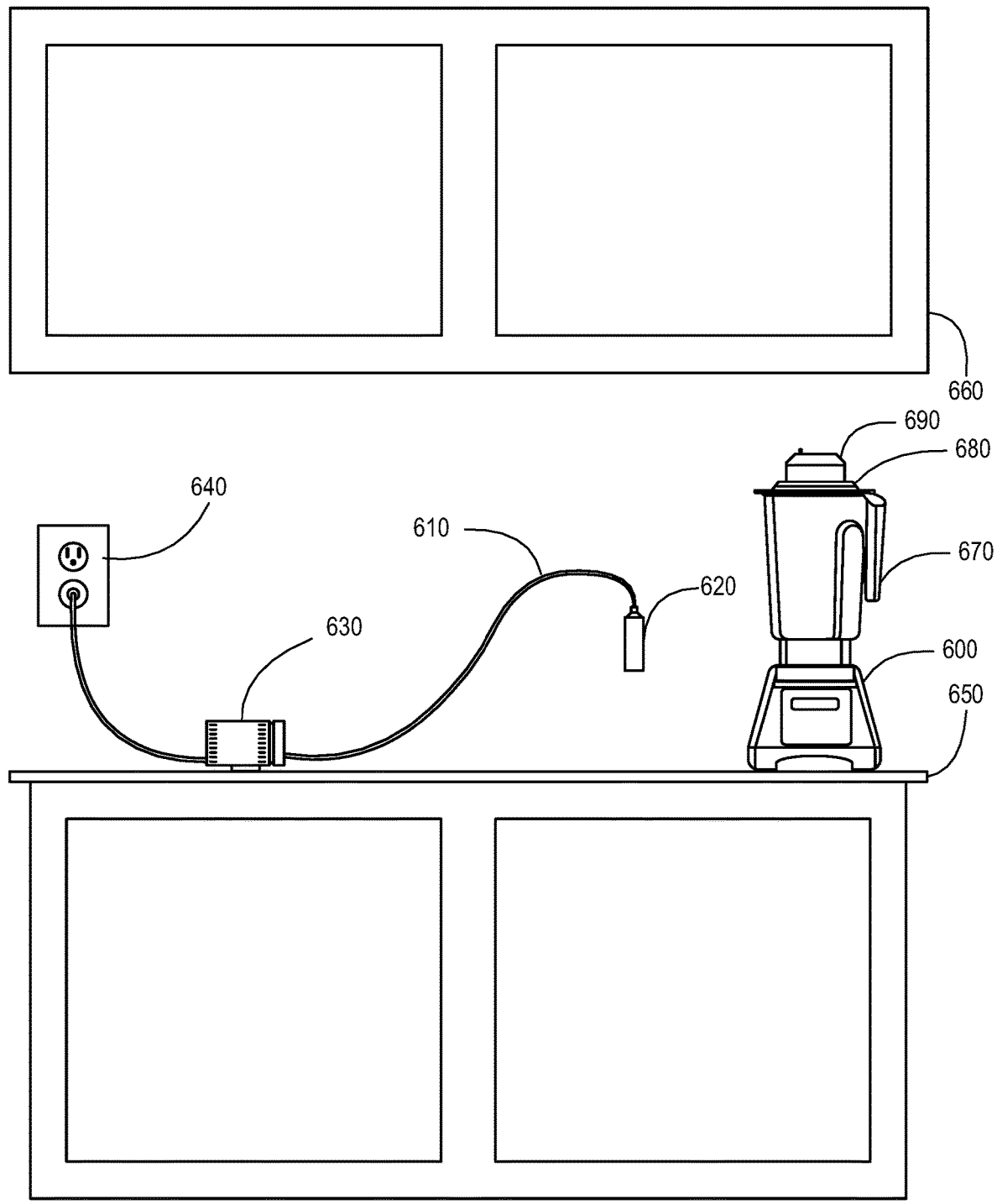
FIG. 6B illustrates the countertop blender of FIG. 6A with the vacuum hose removed from the jar lid adapter and connected to a sous vide cooking device.

FIG. 6B illustrates the vacuum hose 610 detached from the jar lid adapter 690 and connected to the sous vide cooking device 620. In some embodiments the vacuum pump 630 includes settings for operating with blenders and other devices such as sous vide cooking device 620.

Figure 6C:
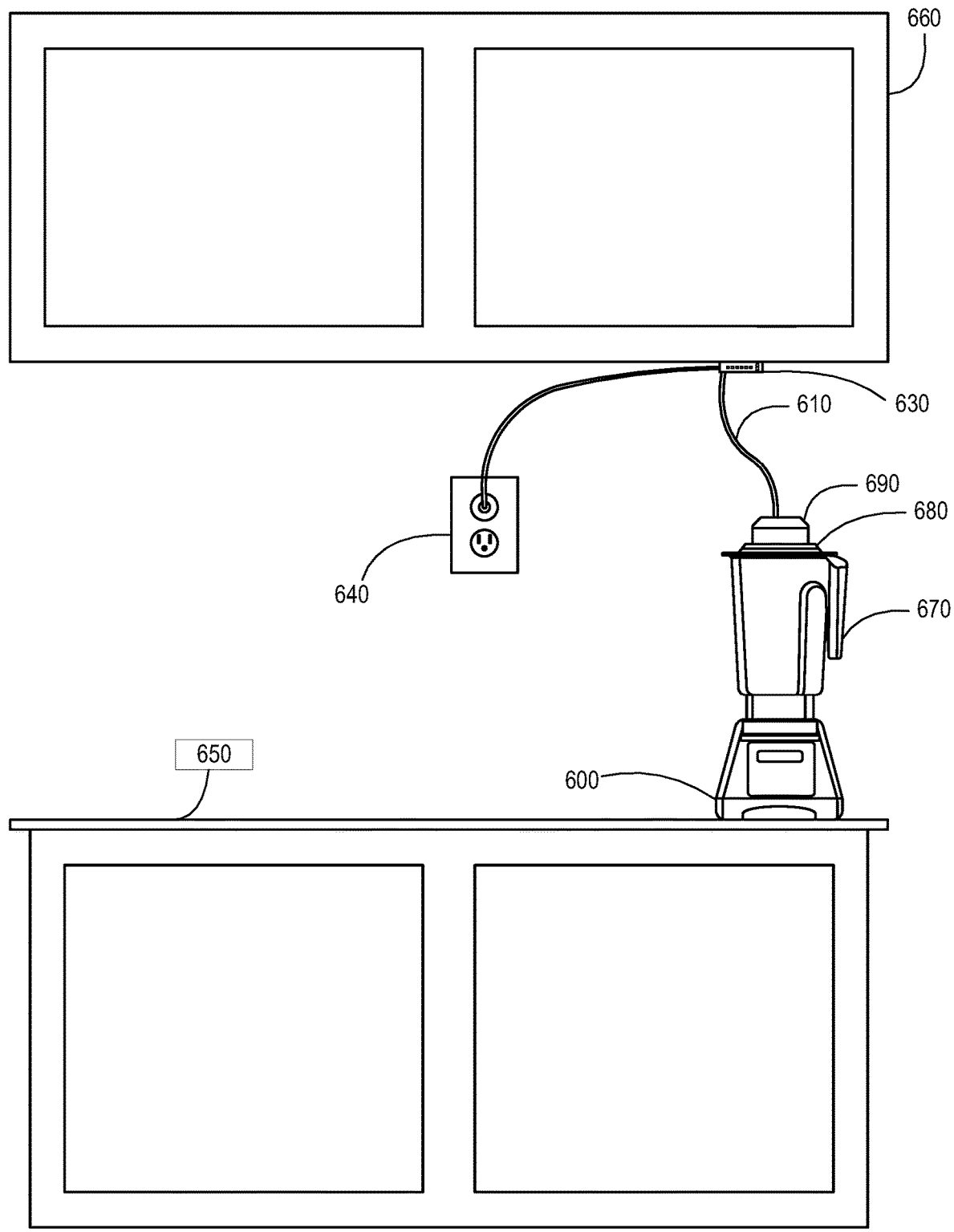
FIG. 6C illustrates an on-the-counter blender with a jar lid adapter connected to a vacuum pump mounted beneath an overhead cabinet, where status lights and a power switch of the vacuum pump are accessible.

FIG. 6C illustrates an on-the-counter blender with a base 600 and a jar lid adapter 690 connected to a vacuum pump 630 mounted beneath an overhead cabinet 660. As illustrated, the vacuum pump 630 includes a power switch and various status lights indicating the strength of the vacuum and/or a power status of the vacuum pump 630.

Figure 6D:
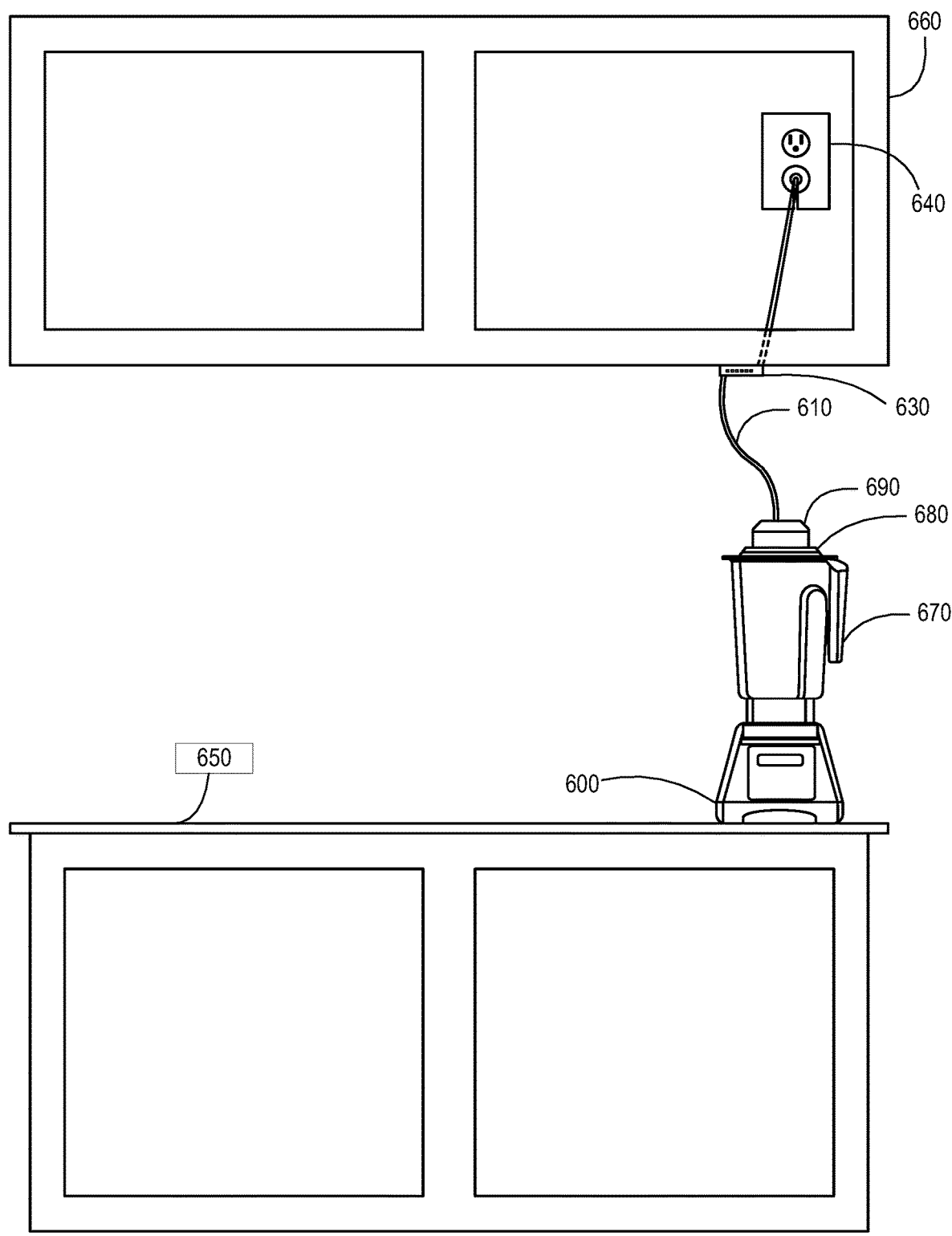
FIG. 6D illustrates an on-the-counter blender with a jar lid adapter connected to a vacuum pump mounted beneath an overhead cabinet, where the plug is inside of the cabinet.

FIG. 6D illustrates an alternative embodiment or installation of a blender system comprising an on-the-counter 650 blender base 600, blender jar 670, blender jar lid 680, and blender jar lid adapter 690. In one embodiment, a blender jar 670 containing foodstuff and/or liquids can be sealed with a blender jar lid 680 and/or a blender jar lid adapter 690 and then evacuated using a vacuum pump 630 connected to the blender jar 670, blender jar lid 680, and/or blender jar lid adapter 690. The vacuum system may remain connected to the blender system throughout the blending process. The blender jar lid adapter 690 is connected via vacuum hose 610 to a vacuum system comprising a vacuum pump 630 mounted under a cabinet 660 and powered from wall outlet 640 within the cabinet 660.

In various embodiments, the hose 610 may be disconnected from the blender jar lid adapter 690 and retracted or coiled within a storage area beneath the cabinet 660 when the blender system is not in use. In other embodiments, the hose 610 may be removed from the under-cabinet-mounted vacuum pump 630 and stored in a different location or even remain attached to the blender jar lid adapter 690 during storage.

Figure 7:
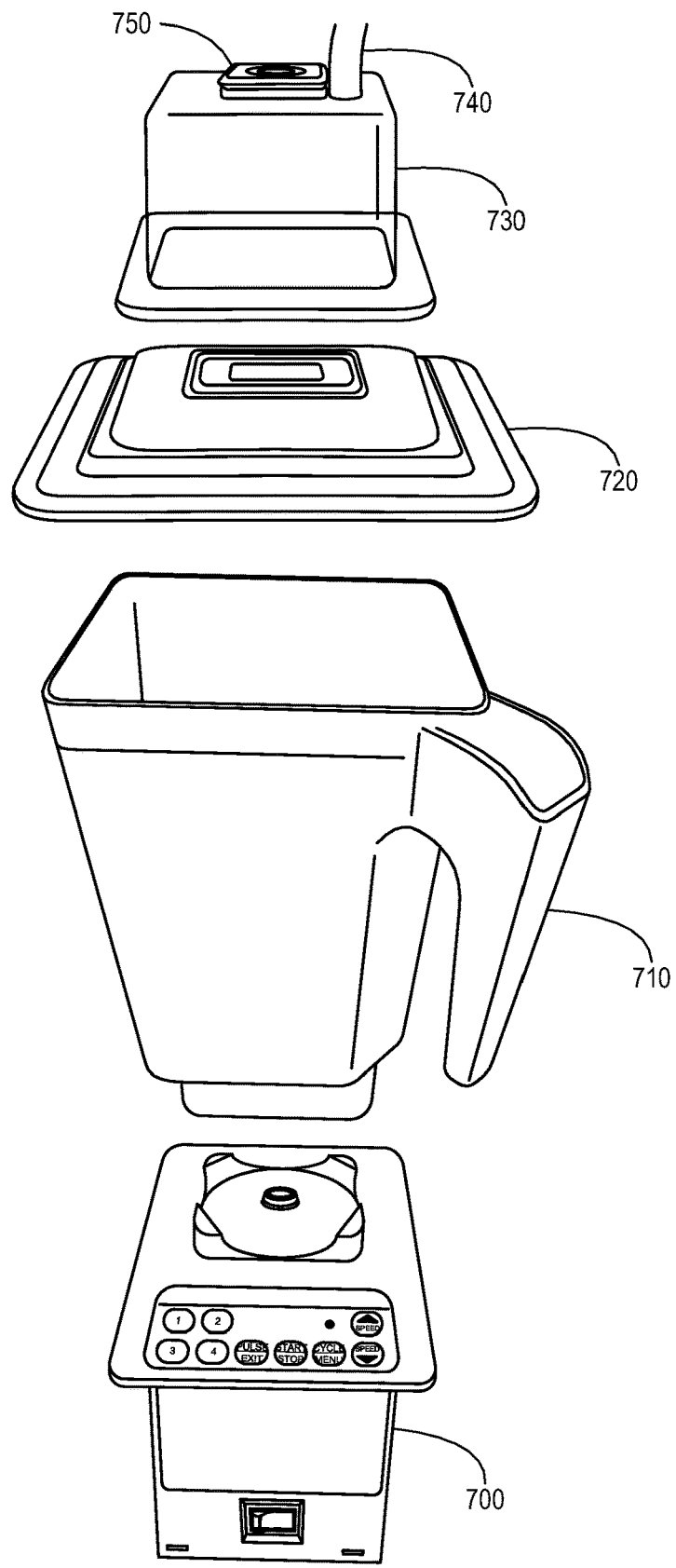
FIG. 7 illustrates disassembled components of a vacuum blender system comprising a blender base, blender jar, blender jar lid, blender jar lid adapter, and vacuum hose.

FIG. 7 illustrates a disassembled view of the components of a vacuum blender system comprising a blender base 700, a blender jar 710, a blender jar lid 720, a vacuum hose 740, and a blender jar lid adapter 730. In one embodiment, the blender jar lid adapter 730 is placed on a blender jar lid 720. The vacuum hose 740 is attached to the blender jar lid adapter 730. During the process of achieving a vacuum in the blender jar 710, the blender jar lid adapter 730 reduces the likelihood of foodstuff and/or liquids entering the vacuum system by providing a space for the foodstuff and/or liquids suctioned out of the blender jar 710. In some embodiments, a filter is included to prevent foodstuff from entering the vacuum system. The blender jar lid adapter 730 has a vacuum release vent 750 that is used to equalize the pressure after the vacuum blending process is complete.

Figure 8:
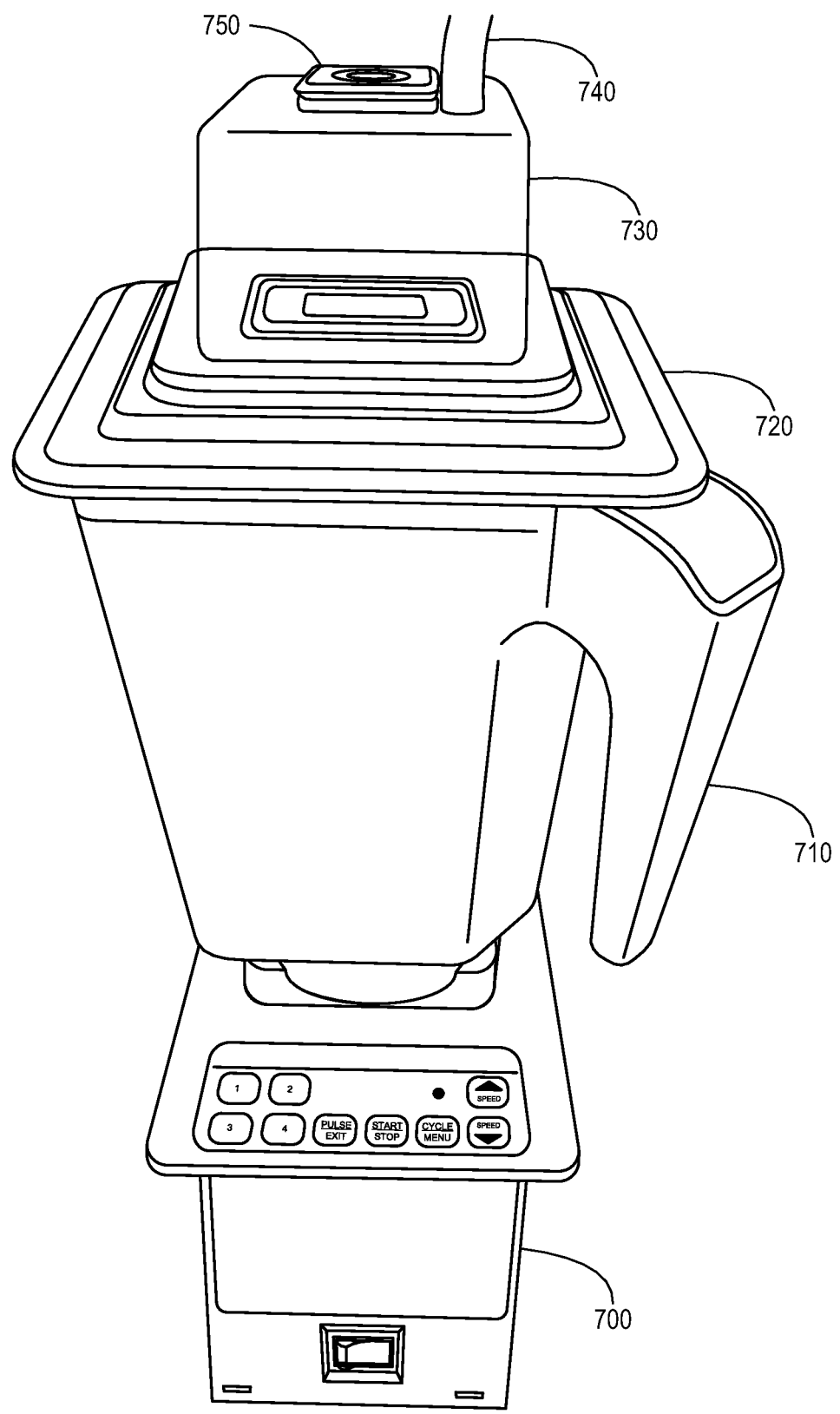
FIG. 8 illustrates the vacuum blender system of FIG. 7 in an assembled state, comprising a blender base, blender jar, blender jar lid, blender jar lid adapter, and vacuum hose.

FIG. 8 illustrates the vacuum blender system of FIG. 7 in an assembled state and comprising a blender base 700, blender jar 710, blender jar lid 720, blender jar lid adapter 730, and vacuum hose 740. In one embodiment, a blender jar lid adapter 730 is placed on a blender jar lid 720. The vacuum hose 740 is attached to the blender jar lid adapter. During the process of achieving a vacuum in the blender jar 710, the blender jar lid adapter 730 reduces the likelihood of food and/or liquids entering the vacuum system. The blender jar lid adapter 730 has a vacuum release vent 750 that is used to equalize the pressure after the vacuum blending process is complete.

In some embodiments, a vacuum storage bag can be evacuated of air using a vacuum hose and an attachment. As previously described, a vacuum hose of a vacuum pump may be disconnected from the blender system and used for other purposes, such as sous vide cooking or vacuum sealed storage bags.

Various foodstuffs can be stored within vacuumed storage bags, according to one embodiment. The vacuum hose may have a connector that can be universally connected to the vacuum storage bags or connected to a blender jar lid or blender jar lid adapter. In other embodiments, an intermediary interface may be utilized to connect the vacuum hose with the vacuum storage bags.

Figure 9:
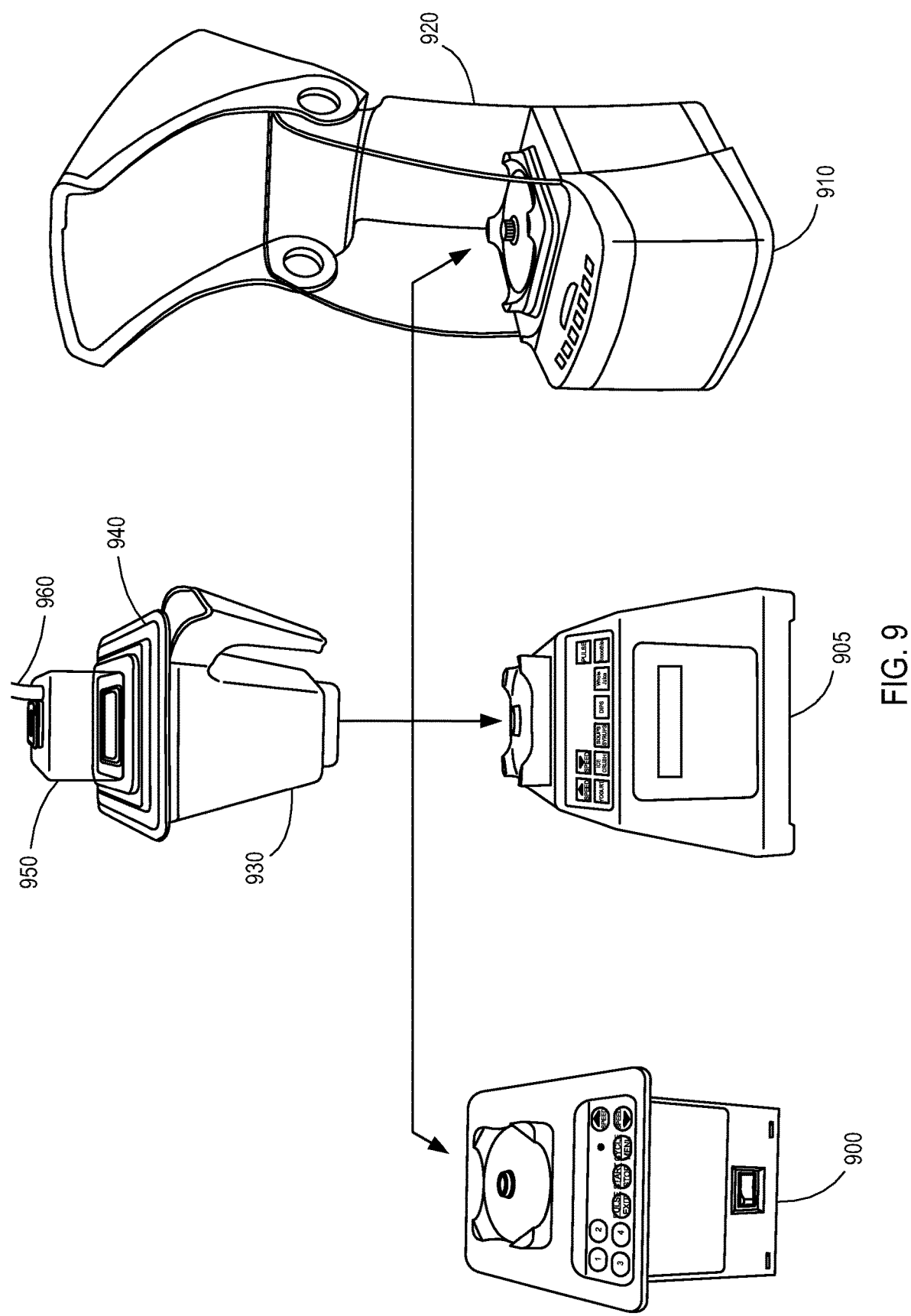
FIG. 9 illustrates a blender jar with a blender jar lid and blender jar lid adapter connected to a vacuum hose, the blender jar being configured to vacuum blend with an in-the-counter blender base, countertop blender base, and/or enclosed blender base.

FIG. 9 illustrates a blender jar 930 equipped with a blender jar lid 940 and blender jar lid adapter 950 connected to a vacuum hose 960. As illustrated, the blender jar 930 can be configured to vacuum blend with an in-the-counter blender base 900, countertop blender base 905, and/or enclosed blender base 910. Enclosed blender base 910 is shown in a blender enclosure 920. Thus, the vacuum-equipped blender jar 930, blender jar lid 940, and/or blender jar lid adapter 950 may be used on a variety of blender bases.

Figure 10:
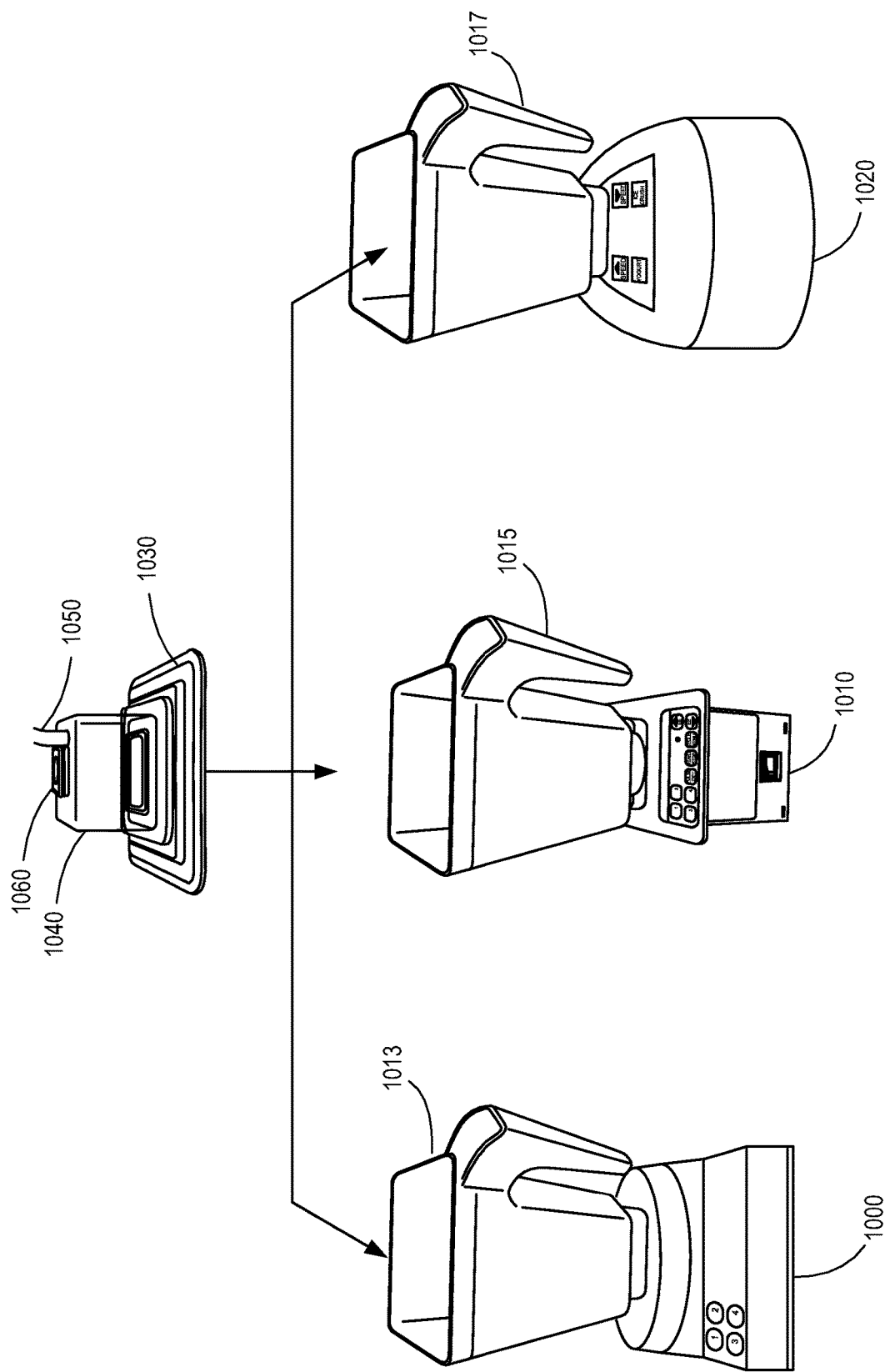
FIG. 10 illustrates blender jars from various manufacturers, equipped with a blender jar lid, blender jar lid adapter, and vacuum hose, to vacuum blend with the associated manufacturer's blender bases.

FIG. 10 illustrates blender jars 1013, 1015, and 1020 manufactured to interface with various blender bases 1000, 1010, and 1020 from various manufacturers. In some embodiments, a blender jar lid 1030 may be adapted (e.g., manufactured) to fit one or more different blender jars produced by one or more different blender jar manufacturers. Blender jar lid adapter 1040 may connect to the blender jar lid 1030 manufactured for a specific blender jar of a specific manufacturer. In other embodiments, the blender jar lid adapter 1040 may be adapted (e.g., manufactured) to fit the blender jar lids of one or more other manufacturers. The blender jar lid adapter 1040 connects to the vacuum system via vacuum hose 1050. Vacuum release vent 1060 is used to equalize pressure to permit safe removal of the blender jar lid 1030 after blending.

Figure 11B:
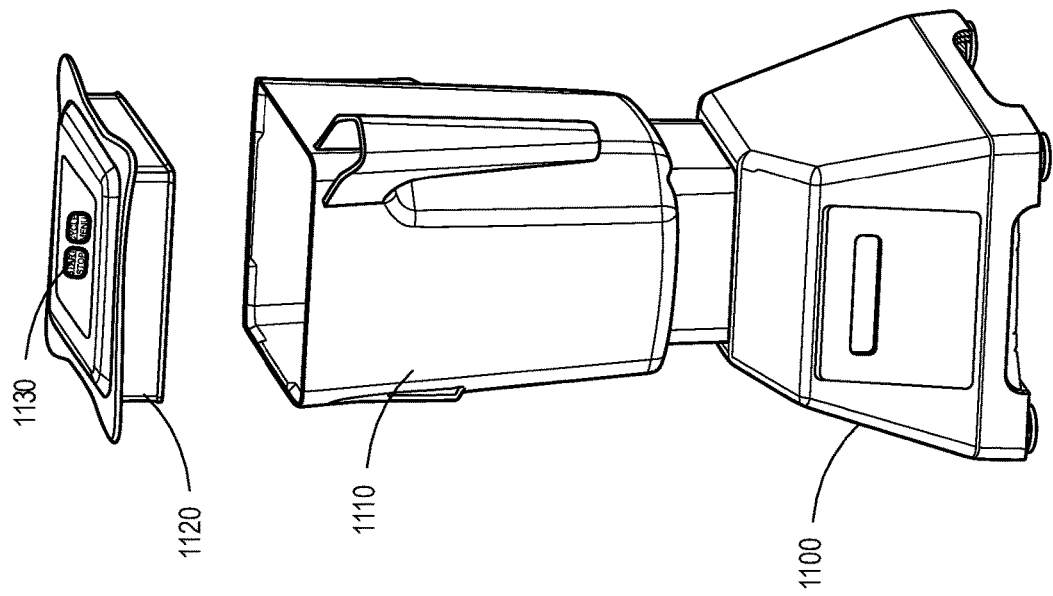
FIG. 11B illustrates the embodiment of FIG. 11A with the vacuum blender jar lid removed.
Figure 11A:
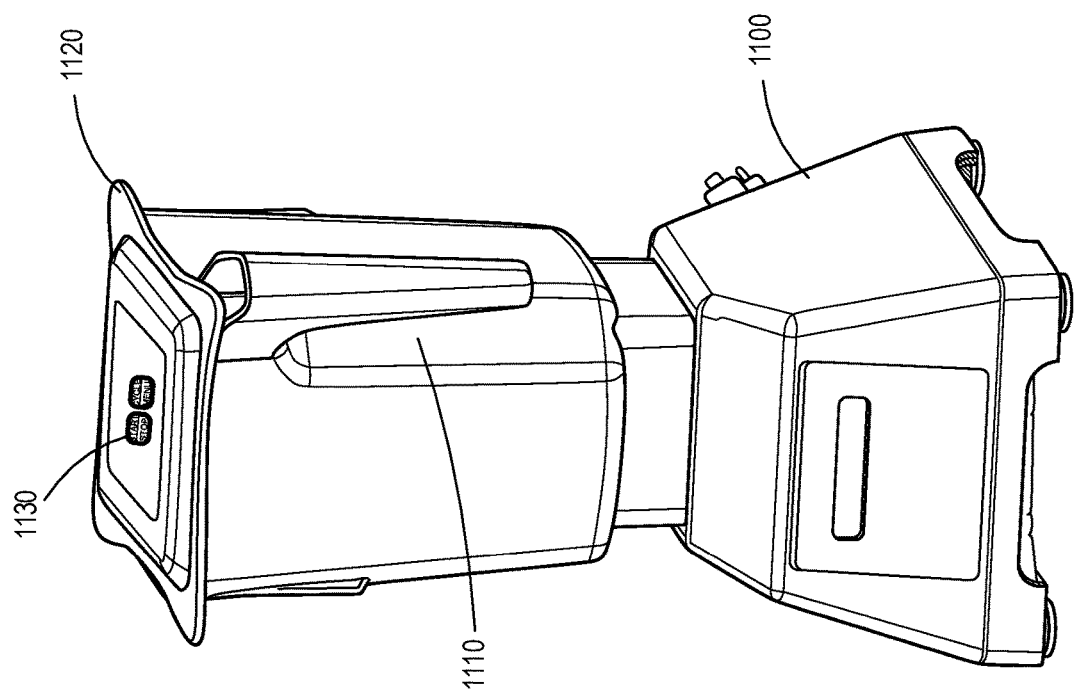
FIG. 11A illustrates a blender base and a blender jar equipped with a vacuum blender jar lid.

FIG. 11A illustrates a blender base 1100 and a blender jar 1110 equipped with a vacuum blender jar lid 1120 in its closed position and FIG. 11B illustrates the vacuum blender jar lid 1120 in an open position. In one embodiment, the vacuum blender jar lid 1120 comprises a vacuum system, control electronics, power supply, and/or operator notification and control panel 1130. The control electronics may determine when a sufficient vacuum has been reached, may determine when it is safe to remove the vacuum blender jar lid 1120, and/or may determine the temperature of the mixture, consistency of the mixture, and/or other control or informational items of interest. The operator notification and control panel 1130 may collect operator input such as "begin air evacuation" and/or "equalize pressure." The vacuum blender jar lid 1120 may also control properly-equipped blender systems that are connected to it via wires or wirelessly. The vacuum blender jar lid 1120 may include a power supply that may comprise a wired AC, a wired DC, and/or a battery subsystem. A battery-operated version may comprise either replaceable or rechargeable batteries. Rechargeable batteries may be charged separately from the vacuum blender jar lid 1120 and/or the entire jar lid may be connected to a charging system.

Figure 12:
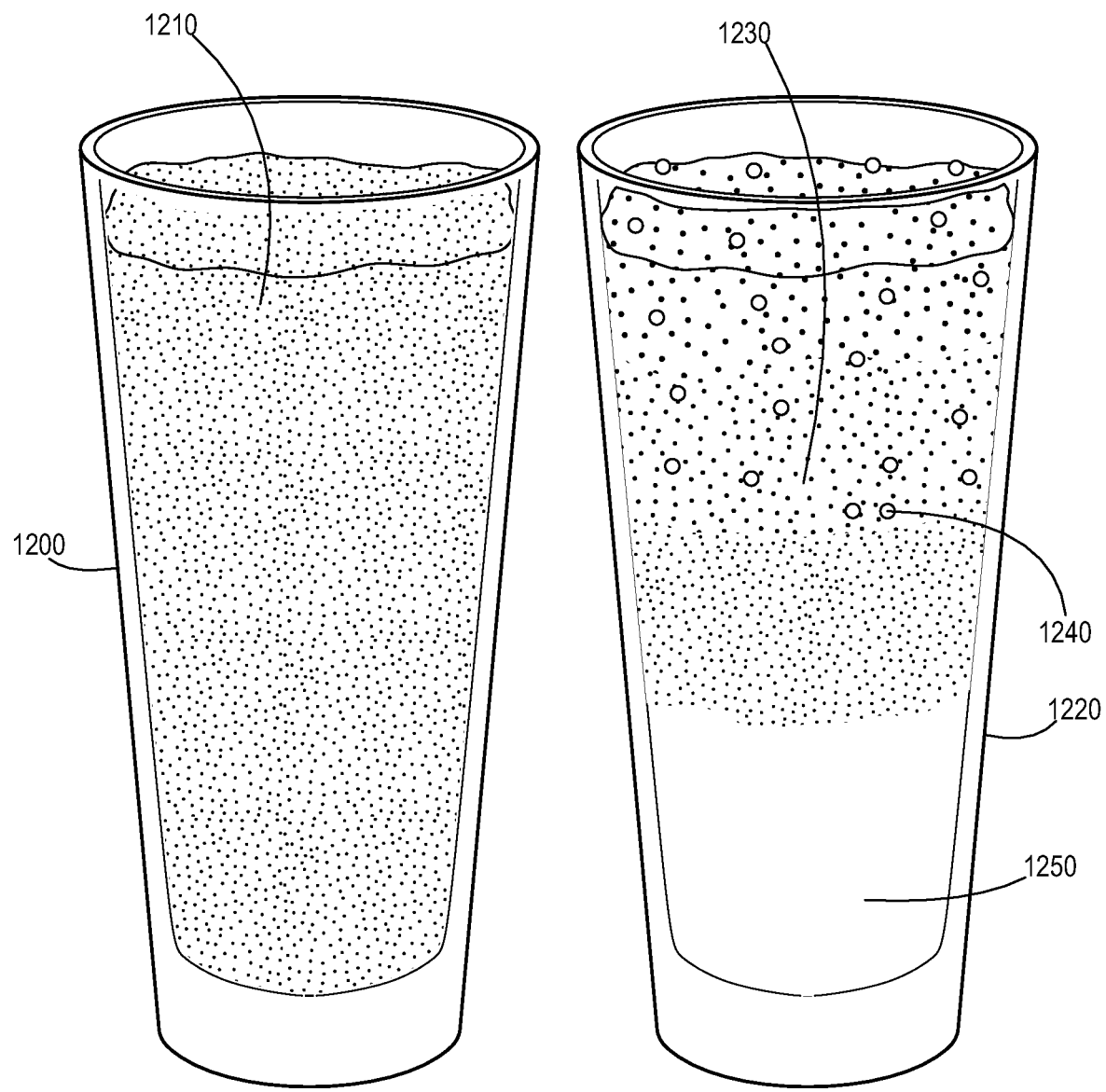
FIG. 12 illustrates two containers of blended foodstuff where the blended food on the left was blended in a vacuum-enabled blender system and the juice on the right was blended in a blender system that does not utilize a vacuum.

The vacuum blending techniques described above advantageously produce blending food product with much less separation than the traditional-blended drinks. In FIG. 12, the glass 1200 and the glass 1220 each comprise substantially identical mixtures that were blended and left to sit for approximately the same amount of time. However, glass 1200 contains foodstuff 1210 that was blended in a vacuum-equipped blending system, such as those described above. In contrast, glass 1220 contains blended foodstuff 1230 comprising the same constituent parts as blended foodstuff 1210 but blended using a conventional blender system that does not utilize a vacuum. The blended foodstuff 1230 has, relatively quickly, separated into two distinct layers 1240 and 1250. In addition, food particles 1250 are larger than the particles found in blended foodstuff 1210. Thus, all other things being equal, it is apparent that a vacuum-blended drink maintains homogeneity for a longer period of time than a non-vacuum-blended drink (i.e., blended using traditional techniques).

Specific embodiments and applications of the disclosure are described above and illustrated in the figures. It is, however, understood that many adaptations and modifications can be made to the precise configurations and components detailed above. Again, in some cases, well-known features, structures, or operations are not shown or described in detail. Furthermore, the described features, structures, or operations may be combined in any suitable manner in one or more embodiments. It is also appreciated that the components of the embodiments as generally described and illustrated in the figures herein could be arranged and designed in a wide variety of different configurations. That is, all feasible permutations and combinations of embodiments are contemplated.

In the description above, various features are sometimes grouped together in a single embodiment, figure, or description thereof for the purpose of streamlining the disclosure. It will be apparent to those having skill in the art that changes may be made to the details of the above-described embodiments without departing from the underlying principles of the invention.

What is claimed is:

1. A blending apparatus comprising:
an enclosure configured to house a blender jar, the enclosure comprising a lid configured to form an airtight seal of the enclosure; and
a vacuum system in fluid communication with an interior of the enclosure, the vacuum system configured to remove air from the enclosure,
wherein the vacuum system is simultaneously operable with a plurality of enclosures.

2. The apparatus of claim 1, wherein the lid comprises a suction connector configured to interface with a jar lid on the blender jar.

3. The apparatus of claim 1 further comprising a valve configured to equalize pressure in the enclosure.

4. A blending apparatus comprising:
an enclosure configured to house a blender jar, the enclosure comprising a lid configured to form an airtight seal of the enclosure; and
a vacuum system in fluid communication with an interior of the enclosure, the vacuum system configured to remove air from the enclosure;
a hose to form a fluid communication between the enclosure and the vacuum system;
a pinch valve configured to regulate the flow of air between the vacuum system and the enclosure by pinching the hose in response to the lid being in an open position.

5. The apparatus of claim 4, further comprising a valve configured to equalize pressure in the enclosure.

6. The apparatus of claim 4, wherein the lid comprises a suction connector configured to interface with a jar lid on the blender jar.

7. The apparatus of claim 1, wherein the vacuum system is configured to stop withdrawing air from the enclosure in response to the lid of the enclosure being in an open position.

8. The apparatus of claim 1 further comprising a sensor configured to determine whether the lid of the enclosure is in an open or closed position and to signal the determination of whether the lid is in an open or closed position to a controller.

9. The apparatus of claim 1 further comprising a tank in fluid communication with the enclosure and the vacuum system, the tank configured to receive foodstuff drawn from the blender jar, such that the foodstuff does not enter the vacuum system.

10. The apparatus of claim 1 further comprising a central processing unit configured to transmit instructions to the vacuum system.

11. The apparatus of claim 1 further comprising a pressure gauge configured to monitor the pressure within the enclosure.

12. A method for blending foodstuff comprising:
housing a first blender containing foodstuff in a first enclosure defining a first airtight space;
housing a second blender containing foodstuff in a second enclosure defining a second airtight space;
creating a vacuum inside the first enclosure and the second enclosure, simultaneously using a single vacuum system; and
blending the foodstuff in the first blender and the second blender after the vacuum has been created inside the first enclosure and the second enclosure.

13. A blending system comprising:
a vacuum system to simultaneously interface with multiple blender jars to create vacuums within each of the interfaced blender jars;
a first blender comprising:
a first blender jar configured to hold foodstuff;
a first blender lid configured to seal the blender jar; and
a first lid adapter to form a fluid communication between the vacuum system and the blender jar to create a vacuum inside the blender jar; and
a second blender comprising:
a second blender jar;
a second blender configured to seal the blender jar;
a second lid adapter to form a fluid communication between the vacuum system and the blender jar to create a vacuum inside the blender jar.

14. The system of claim 13, wherein the first lid adapter is configured to receive the foodstuff that is suctioned out of the first blender jar and to prevent the foodstuff from entering the vacuum system.

15. The system of claim 13, wherein the first lid adapter is configured to fit a plurality of different blender jar lids.

16. The system of claim 13, wherein the first lid adapter is configured to replace a fill cap in a hole of the first blender lid.

17. The system of claim 13, wherein the vacuum system is detachable from the first blender and configured to couple with a sous vide cooking device.

18. The system of claim 13, wherein the first lid adapter is integrally formed on the first blender lid.

19. The system of claim 13, wherein the vacuum system comprises a hose configured to form a fluid communication between the first blender and the vacuum system.

20. The system of claim 13, wherein the first lid adapter comprises a suction connector configured to interface with the first blender lid.

* * * * *